(12) United States Patent
Velusamy et al.

(10) Patent No.: US 9,813,976 B2
(45) Date of Patent: Nov. 7, 2017

(54) DETECTION OF A DELINQUENT MOBILE DEVICE

(71) Applicant: T-Mobile, USA, Inc., Bellevue, WA (US)

(72) Inventors: Senthil Kumar Mulluppadi Velusamy, Bellevue, WA (US); Kevin Lau, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/082,203

(22) Filed: Mar. 28, 2016

(65) Prior Publication Data
US 2017/0230900 A1    Aug. 10, 2017

Related U.S. Application Data

(60) Provisional application No. 62/293,286, filed on Feb. 9, 2016.

(51) Int. Cl.
| H04M 11/00 | (2006.01) |
| H04W 48/16 | (2009.01) |
| H04W 8/18 | (2009.01) |
| H04L 29/08 | (2006.01) |
| H04W 8/24 | (2009.01) |

(52) U.S. Cl.
CPC ............ *H04W 48/16* (2013.01); *H04L 67/10* (2013.01); *H04W 8/183* (2013.01); *H04W 8/24* (2013.01)

(58) Field of Classification Search
CPC ....... H04W 12/12; H04W 4/24; H04W 8/245; H04M 1/72519; G06Q 40/10

USPC ............... 455/410, 406, 550, 1, 418; 705/30
See application file for complete search history.

(56) References Cited

U.S. PATENT DOCUMENTS

| 8,645,238 | B1 | 2/2014 | Gailloux et al. | |
| 8,719,126 | B2* | 5/2014 | Hall | G06Q 20/04 |
| | | | | 705/35 |
| 9,466,052 | B1* | 10/2016 | Cope | G06Q 20/085 |
| 2005/0170813 | A1 | 8/2005 | Choi | |
| 2008/0221741 | A1* | 9/2008 | Pillar | A62C 27/00 |
| | | | | 701/1 |

(Continued)

FOREIGN PATENT DOCUMENTS

| KR | 100770313 B1 | 10/2007 |
| KR | 100849334 B1 | 7/2008 |

OTHER PUBLICATIONS

International Search Report & Written Opinion dated Jul. 26, 2017 received in PCT Application No. PCT/US2017/017200, 12 pages.

(Continued)

*Primary Examiner* — Danh Le
(74) *Attorney, Agent, or Firm* — Han Santos, PLLC; Elliott Y. Chen

(57) ABSTRACT

A method and system of detecting a delinquent mobile user device. An international mobile subscriber identity (IMSI) of a subscriber identity module (SIM) card of the user device is determined by the user device. The IMSI is sent to a Remote Recovery Server (RRS). A message is received from the RRS as to whether the IMSI is authorized for the user device. Upon determining that the IMSI is not authorized for the user device, a notification is displayed on a display of the user device.

23 Claims, 13 Drawing Sheets

(56) References Cited

U.S. PATENT DOCUMENTS

| | | | |
|---|---|---|---|
| 2009/0213846 A1* | 8/2009 | Joseph | H04L 12/2856 |
| | | | 370/352 |
| 2010/0301114 A1 | 12/2010 | Faro et al. | |
| 2011/0166920 A1 | 7/2011 | Ross et al. | |
| 2012/0109820 A1* | 5/2012 | Galit | G06Q 40/02 |
| | | | 705/41 |
| 2012/0166695 A1 | 6/2012 | Venus et al. | |
| 2012/0185389 A1 | 7/2012 | Ross et al. | |
| 2012/0265681 A1 | 10/2012 | Ross | |
| 2013/0073438 A1* | 3/2013 | Jabbour | G06Q 40/00 |
| | | | 705/30 |
| 2013/0173468 A1 | 7/2013 | Ross | |
| 2013/0212023 A1 | 8/2013 | Ross et al. | |
| 2014/0148127 A1 | 5/2014 | Qian | |
| 2014/0162598 A1* | 6/2014 | Villa-Real | H04M 1/66 |
| | | | 455/411 |
| 2014/0235206 A1 | 8/2014 | Denhez | |
| 2015/0186880 A1 | 7/2015 | Zhang | |
| 2016/0063498 A1 | 3/2016 | Li | |
| 2016/0321663 A1 | 11/2016 | Batlle | |
| 2017/0124569 A1 | 5/2017 | Revelle et al. | |

OTHER PUBLICATIONS

Non-Final Office Action dated Aug. 8, 2017, for U.S. Appl. No. 15/082,388, 12 pages.

* cited by examiner

DETECTION OF A DELINQUENT MOBILE DEVICE

CROSS REFERENCES TO RELATED APPLICATIONS

The present application claims the benefit of priority under 35 U.S.C. §119 from U.S. Provisional Patent Application Ser. No. 62/293,286, entitled "Controlling Device Functionality Based on Account Status," filed on Feb. 9, 2016, which is hereby incorporated by reference in its entirety for all purposes.

BACKGROUND

Today, wireless telecommunication carriers provide their customers various competitive options for obtaining mobile communication devices, such as smartphones. Some devices are carrier-locked, to restrict the devices to the particular wireless telecommunication carrier and a specific region. A user device may be carrier locked to a wireless communication carrier via a subscriber identity module (SIM) lock engine that is located within the modem of the user device. The restrictions may be formalized via an equipment installment plan (EIP) or equipment lease.

One of the reasons a wireless telecommunication carrier locks a communication device to a particular carrier is because these devices may be offered at a discount to customers in exchange for a contract to pay for the use of the network for a predetermined time period. The agreements may be formalized via an equipment lease or installment plan, collectively referred to herein as an equipment installment plan (EIP). This subsidized device business model allows the wireless telecommunication carrier to recoup the cost of the communication device during the term of the contract.

However, an unlocked subsidized device could be used on an alternate network for a lower fee, thereby disrupting the business model. In some scenarios, a user device may be stolen by a third party (e.g., a thief). Accordingly, nefarious actors may attempt to exploit the value of a user device provided by a wireless telecommunication carrier without having made the requisite payments. For example, a nefarious actor may attempt to sell an unpaid EIP user device to a person who may swap the original SIM card for another. In another scenario, an EIP subscriber may fall behind on or avoid making payments (e.g., incur a "bad debt") while still taking advantage of various functionality of the user device on another wireless telecommunication carrier and/or with ubiquitous Wi-Fi.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
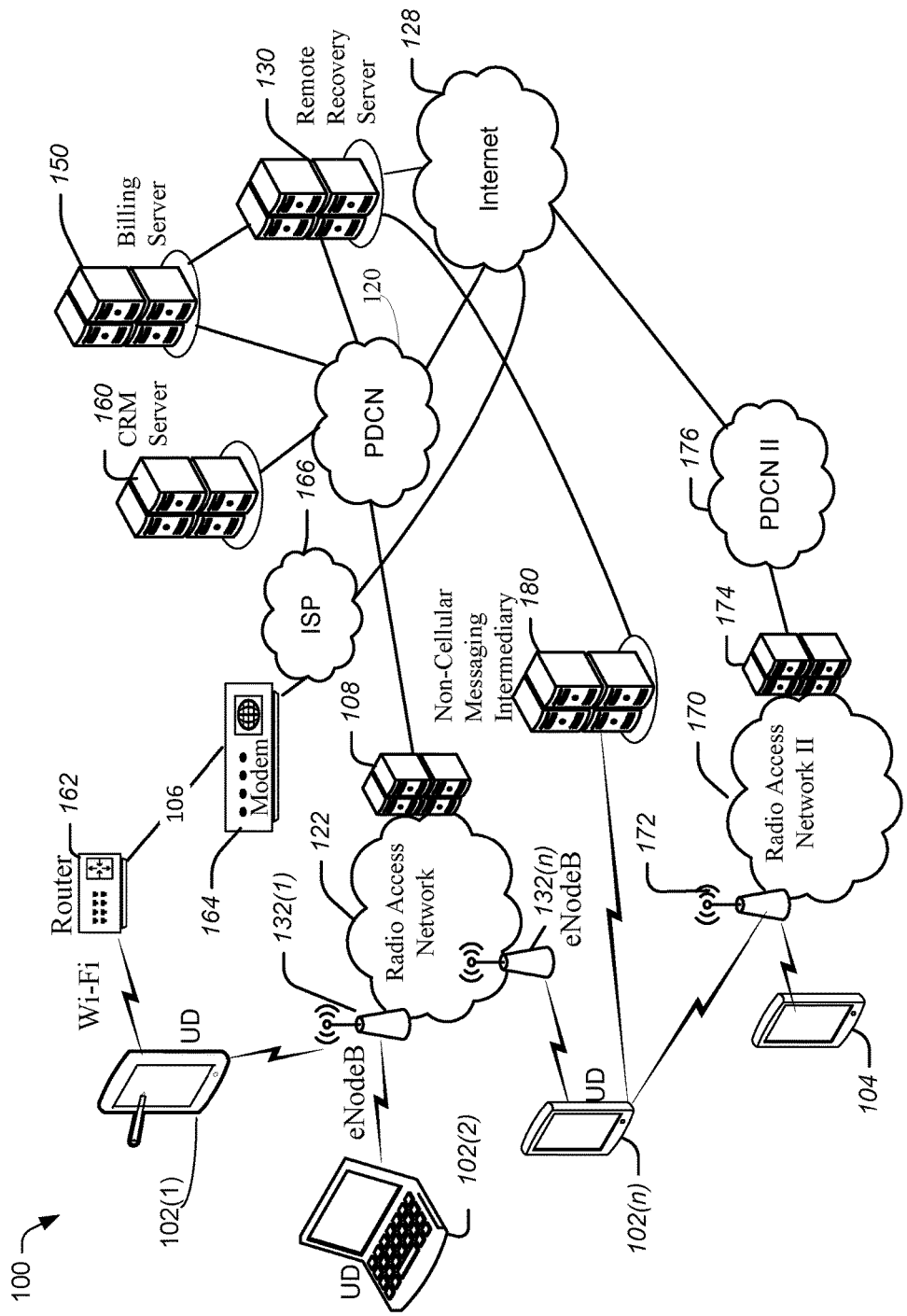
FIG. 1 illustrates an example architecture for implementing a system for controlling a user device functionality based on an account status.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to methods and systems of identifying a delinquent user device, and more particularly, controlling a functionality of a user device that is being operated beyond the scope of an original agreement with a wireless telecommunication carrier, sometimes referred to herein as EIP. Conditions are detected that are consistent with the user device being used in an unauthorized way in view of the original agreement. The detection of an unauthorized use of the user device is a trigger event. A user device may be limited and/or augmented in functionality in response to a trigger event, such as a detected "bad debt" condition. In various embodiments, depending on the specific detected "bad debt" condition, a user device may be automatically controlled to (1) display a "Payment Past Due" notification or other notification on the user interface; (2) implement a lock screen that allows partial functionality, such as an emergency (e.g., 911) call and to make payments (e.g., via the Internet or a customer service representative); and/or (3) augment or partially disable user device functionality.

In one embodiment, in order to monitor user devices under an EIP to detect a trigger event such as a "bad debt" condition, there is a Remote Recovery Server (RRS) that may have stored in its memory a table of records that keeps a list of various data related to the user device. For example, the RRS may include or have access to, inter alia, the following data related to each user device under an EIP: (1) an international mobile station equipment identity (IMEI) of the user device; (2) an international mobile subscriber identity (IMSI) of the assigned subscriber; and/or (3) an EIP or lease status of the assigned subscriber. Accordingly, the RRS may communicate with and receive updates from various systems, such as a billing system, notification system, and a Home Location Register (HLR) of the radio access network of the wireless telecommunication carrier.

In one embodiment, the user device may include a User Device Recovery Tool (UDRT), which may be a program that is configured to interact with the RRS to perform various functions on the user device including to help identifying when the user device is being operated in an unauthorized way (e.g., beyond the scope of an original agreement), limiting various aspects of the functionality of the user device, and restoring the various aspects of the functionality of the user device when appropriate criteria are met.

When the RRS has detected that a subscriber is behind on payments for a user device (e.g., a triggering event), the RRS may communicate with the user device's Recovery Tool to activate an appropriate response on the user device. In various embodiments, an appropriate response may be a notification to an appropriate recipient, locking the screen of the user device, or augmenting (e.g., limiting) the functionality of the user device. In one embodiment, the communication of the RRS with the user device is via a non-cellular messaging intermediary that does not rely on a cellular connection, such as Google Cloud Messaging (GCM). For example, GCM provides a way to send data from the servers discussed herein to the user device applications, such as the Recovery Tool.

In one embodiment, even when the functionality of a user device is limited, per government regulations, the user device is provided the ability to make emergency (E-911) calls. Additionally, in some cases, the user device may be provided limited access to voice and/or data services such that the user can arrange payments via the Internet or allow the user of the user device to speak with a customer care or collections representative. When the account is replenished at least in part, one or more functions (e.g., features) that were previously limited (e.g., restricted or disabled) are restored. In one embodiment, the number of features that are restored is based on the account status of the user device.

The techniques described herein may be implemented in a number of ways. Example implementations are provided below with reference to the following figures.

Example Network Architecture

FIG. 1 illustrates an example architecture 100 for implementing a system for determining whether a user device is being operated beyond the scope of an original agreement and controlling the user device functionality based on an account status. FIG. 1 illustrates a first radio access network 122 and a second radio access network 170, as may be operated by two separate wireless telecommunication carriers or service providers to provide a wide range of mobile communication services and ancillary services or features to its subscriber customers and associated mobile device users. For example, the radio access network 122 provides communications between various user devices (UD), such as 102(1) to 102(n), as well as communications for the UD with networks and stations outside the radio access network 122, such as UD's 104 subscribed to the second radio access network 170.

For purposes of later discussion, several UD's appear in the drawing, to represent some examples of the devices that may receive various services via the radio access network 122. Today, UD's typically take the form of portable handsets, smart-phones, tablet computers, personal digital assistants (PDAs), and smart watches, although they may be implemented in other form factors, including consumer, business, and medical electronic devices. UD's may communicate with other UD's and access resources of the packet data communication network (PDCN) 120 in various ways, including the radio access network 122 (discussed below) and via Wi-Fi. In some embodiments, a UD (e.g., UD 102(1)) may communicate over Wi-Fi with a router 162, which is coupled 106 to a modem 164, which in turn is coupled to an Internet service provider (ISP), ultimately leading to the Internet 128.

Radio access network 122 allows users of the UD's (e.g., customers or subscribers to the radio access network 122) to initiate communication, and receive information from the PDCN 120. Physical elements of a radio access network 122, operated by one of the wireless telecommunication carriers, include a number of base stations, represented in the example of FIG. 1 by an eNodeB 132(1) or 132(n) node. Such eNodeB 132(1) to 132(n) nodes may include a base transceiver system (BTS) that communicates via an antennae system at the site of the node and over the air-link with one or more of the UD's (102(1) to 102(n)) when the UD's are within range. Each eNodeB 132 node may include a BTS coupled to several antennae mounted on a radio tower within a coverage area often referred to as a "cell." The BTS is the part of the radio network that sends and receives RF signals to/from the UD's that the eNodeB node 132(1) to 132(n) currently serves. The second radio access network 170 may have similar base stations (e.g., 172).

The radio access network 122 carries the user communications for the UD's between the respective eNodeB 132 nodes and other elements with or through which the UD's communicate. Individual elements such as switches and/or routers forming the radio access network 122 or 170 are omitted here for simplicity. For example, the radio access network 122 and/or 170 may include a home location register (HLR), which stores a subscriber profile for each of the wireless subscribers of the radio access network 122 and their associated user devices 102(1) to 102(n). For example, the HLR stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR can also be a stand-alone device. The HLR also tracks the current point of attachment of the user device to the radio access network 122.

It will be understood that the various network elements can communicate with each other, as well as other aspects of the radio access network 122, and other networks (e.g., the public switched telephone network (not shown) and the Internet 128) either directly or indirectly.

The wireless telecommunication carrier of the radio access network 122 may also operate a number of systems that provide ancillary functions in support of the communications services and/or application services provided through the radio access network 122, and those elements communicate with other nodes or elements of the radio access network 122, such as one or more private IP type packet data networks 120 based on a packet data communication network (PDCN), sometimes referred to as an Intranet, (i.e., a private network).

Generally, such systems are part of, or connected for, communication via the private network, represented by PDCN 120 and may provide additional services such as determining the account status of a UD, blocking or limiting functionality of a user device, offering alternate services, and restoring functionality of a UD. To that end, in various embodiments there may be an RRS 130 and a billing server 150, which may be coupled for communication via the private network 120. The billing server 150 may update the RRS 130 with past-due payment status related to the UD. In turn, the RRS 130 may send a notification of past-due payment to the Device Recovery Tool (e.g., program) of a UD. Consequently, the Device Recovery Tool may display a "Payment Past Due" notification and/or implement a warning lock screen on a display of the UD. One or more options may be provided to replenish the account associated with the user device.

In one example, there is an customer resource management (CRM) server 160 configured to provide its account holders (e.g., user of a UD and/or an authorized customer service representative (CSR)) on-line access to a variety of functions related to the account holders' account, such as on-line payment information, subscription changes, where and/or to whom the notification information is to be provided (e.g., to the account holder, application provider, system administrator, etc.), how the notifications are to be sent (e.g., via short message service (SMS), e-mail, regular mail, GCM, etc.), password control, and the like. Thus, the transport of notifications to and from a UD may be non-cellular (e.g., via Wi-Fi over the Internet 128). The CRM server 160 may provide the user an interface via the Internet 128 to access the account information. Hence, a user's terminal, such as a PC, or the UD itself may be used to access on-line information about a UD's user's account, which the radio access network 122 carrier makes available via the carrier's Internet site, accessible through the Internet 128.

In the example of FIG. 1, there is an RRS 130 that is configured to receive account status information of user devices that are subscribed to the radio access network 122, as well as other information. The RRS 130 receives the information from the billing server 150 or the CRM server 160 in the form of a data package. The RRS 130 is also configured to send instructions to a UD that has been identified to have exceeded the scope of the EIP agreement with the wireless telecommunication carrier of radio access network 122 (e.g., has incurred bad debt). In various embodiments, these instructions may interact with a program on the user device, sometimes referred to herein as the UDRT, to block or restrict functionality of the user device. In one embodiment, the RRS 130 may also be configured to restore functionality of the user device upon determining that the user device is no longer subject to bad debt.

In one embodiment, GCM 180 is used to communicate with UD's (e.g., UD 102(*n*)), even though they may have been nefariously switched to the alternate radio access network 170.

While the RRS 130, the billing server 150, and the CRM server 160 are illustrated by way of example as separate servers, they may be implemented on different hardware platform combinations. Thus, the functionality described herein with respect to each of the servers 130, 150, and 160 can also be provided by one or multiple different computing devices. In other words, the RRS 130, billing server 150, and CRM server 160, need not be a stand-alone computing devices but can be combined in various configurations. In one embodiment, the RRS 130, billing server 150, and/or the CRM server 160 may have a scalable and fault-tolerant architecture, such as that provided by the cloud.

Example User Device Components

Figure 2:
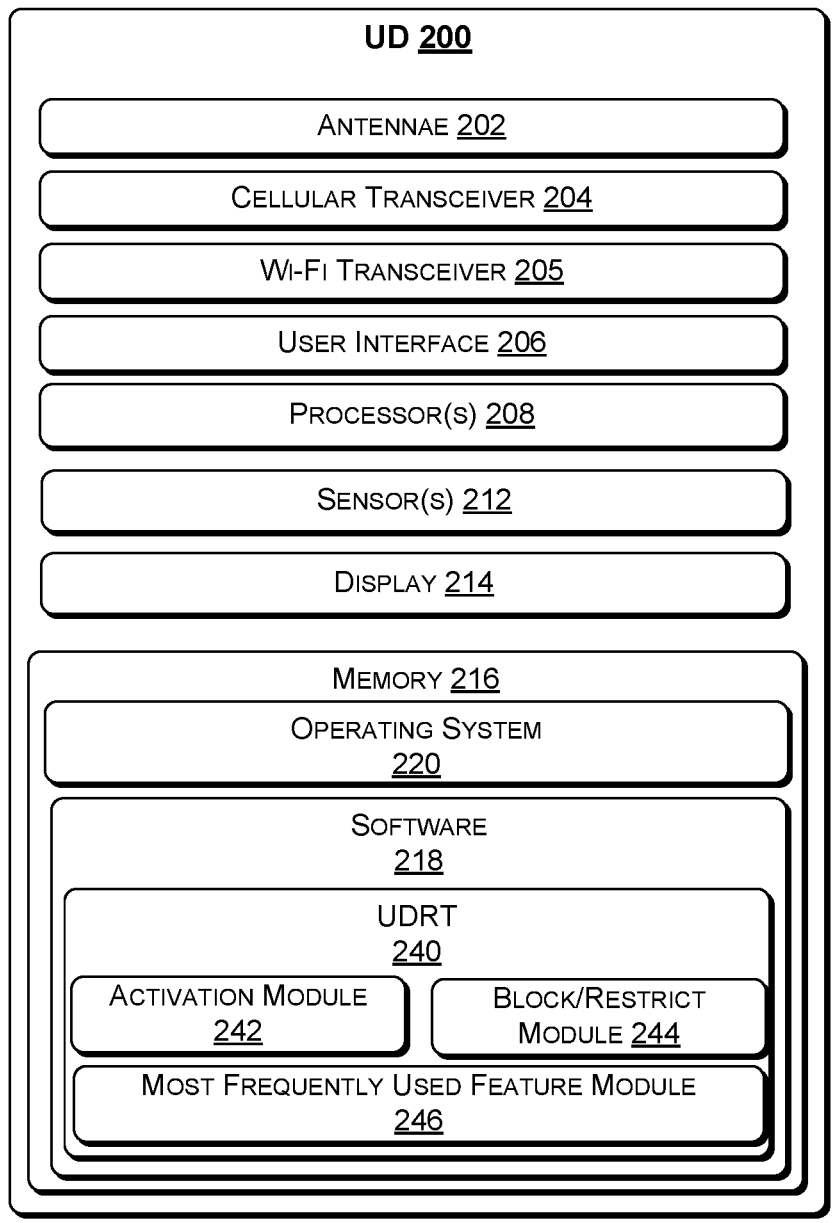
FIG. 2 is a block diagram showing various components of an illustrative user device (UD).

FIG. 2 is a block diagram showing various components of an illustrative UD 200. As discussed in the context of FIG. 1, the control of a user device functionality based on the account status discussed herein involves an interaction with appropriately configured user devices. To that end, it may be useful to consider the functional elements/aspects of an exemplary UD, at a high-level. For purposes of such a discussion, FIG. 2 provides a block diagram illustration of an exemplary UD 200. It will be understood that the UD 200 may be a handset type mobile phone or may be incorporated into another device, such as a personal digital assistant (PDA), a tablet computer, or the like. For discussion purposes, the illustration shows the UD 200 in the form of a handheld smart-phone.

The UD 200 may include one or more antennae 202, a cellular transceiver 204, a Wi-Fi transceiver 205, user interface 206, one or more processors 208, hardware 210, and memory 216. In some embodiments, the antennae 202 include an uplink antenna that sends radio signals to a radio tower, sometimes referred to herein as a base station (e.g., 132(1) in FIG. 1), and a downlink antenna that receives radio signals from the base station. In other embodiments, a single antenna may both send and receive radio signals. The same or other antennas may be used for Wi-Fi communication with a router 162. These signals may be processed by the cellular transceiver 204 or the Wi-Fi transceiver 205, sometimes collectively referred to herein as a network interface, which is configured to receive and transmit digital data.

In one embodiment, the UD 200 includes a user interface 206 that enables a user to provide input and receive output from the UD 200. For example, the user interface 206 may include a data output device (e.g., visual display, audio speakers, haptic device, etc.) that may be used to display notifications from the RRS 130. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces.

The UD 200 may include one or more processors 208, which may be a single-core processor, a multi-core processor, a complex instruction set computing (CISC) processor, or another type of processor. The hardware may include a power source and digital signal processors (DSPs), which may include single-core or multiple-core processors. The processors may perform operation in parallel to process a stream of data that may be provided by probe application and/or operating system 220.

The hardware may also include network processors that manage high speed communication interfaces, including communication interfaces that interact with peripheral components. The network processors and the peripheral components may be linked by switching fabric. The hardware may further include hardware decoders and encoders, a network interface controller, and/or a universal serial bus (USB) controller.

The network interface controller may enable the processors to transmit and receive data via the radio access network 122 of FIG. 1. In some embodiments, the hardware may also include a direct memory access (DMA) engine. The DMA engine may enable the various controllers to access the memory 216 independently of the one or more processors 208 to perform tasks. The various controllers and processors of the UD 200 may execute instructions and perform tasks under the direction of software components that are stored in the memory 216.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components that are executable or accessible by the processor(s) 208 and controller(s) of the UD 200. The various components of the memory 216 may include software 218 and an operating system 220. Each module may include routines, program instructions, objects, and/or data structures that perform particular tasks or implement particular abstract data types. For example, the software 218 of the memory 216 may include a user device reporting tool (UDRT) program that is configured to perform various functions, including functions of helping determine whether a user device is being operated beyond the scope of an original agreement with a telecommunication carrier, limiting UD functionality, and reinstating device functionality, as appropriate.

For example, upon identifying that the UD 200 has an unauthorized SIM card, the RRS 130 may send a message to the UD 200, indicating that the UD 200 is being used in an authorized way. Upon receiving this message, the UDRT may block or limit the functionality of the UD 200.

In one embodiment, the UD 200 may include a most frequently used feature module 246, which is configured to determine the functions, features, and/or applications that are most commonly used by the UD 200, collectively referred to herein as "most frequently used features." For example, typical applications may include particular games, a music player, an Internet browser, social networking applications, camera, navigation, etc. For example, this module 246 determines a predetermined number of most frequently used features that have been used on this particular UD 200 during a predetermined time period (e.g., one month) and stores the information in the memory 216. In one embodiment, the most frequent usage is based on net length of time a features is active or the number of times it is invoked in a predetermined period.

Upon identifying a trigger event (e.g., the UD 200 is being operated beyond the scope of the agreement with the original wireless telecommunication carrier), the UDRT 240 deactivates one or more most frequently used features. In one embodiment, there is an escalating schedule of the number of features that are deactivated (e.g., 1 feature per day) until the account associated with the EIP is replenished.

Upon determining that the UD has a legitimate SIM card (i.e., after it was deactivated), the UDRT may re-activate the UD 200. Accordingly, the software 218 may enable the UD 200 to perform various functions and control hardware components of the UD 200.

The operating system 220 may include components that enable the UD 200 to receive and transmit data via various interfaces (e.g., user controls, communication interface, and/or memory input/output devices), as well as process data using the processors 204 to generate output. The operating system 220 may include a presentation component that presents the output (e.g., display the data on an electronic display of the UD 200, store the data in memory 216, transmit the data to another electronic device, etc.). Additionally, the operating system 220 may include other components that perform various additional functions generally associated with an operating system.

Limiting Device Functionality Responsive to Identified "Bad Debt" Conditions

As mentioned above, the system of FIG. 1 can block or limit UD functionality based on the account status. For example, upon a trigger event, such as determining that a UD is being operated beyond the scope of an agreement with a wireless telecommunication carrier (e.g., when a bad debt is incurred), one or more functions of the UD device may be limited or even blocked. Several functions that can be affected are provided below by way of example only and not limitation:

Lock Screens

Figure 3:
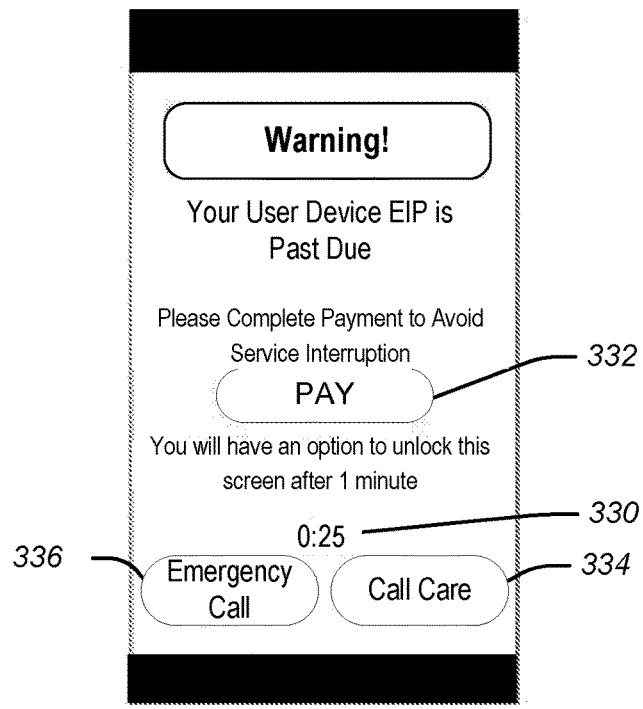
FIG. 3 illustrates an example Warning Lock Screen.

FIG. 3 illustrates an example Warning Lock Screen. It is a screen that is displayed when functionality is temporarily and/or partially disabled. In one embodiment, a notification is sent to the user (e.g., account holder) of the UD, indicating that service may be interrupted if payment is not made within a specified time period. In various embodiments, the warnings may be provided in stages. For example, a warning lock screen may be implemented by the UDRT 240 when an account is detected by the RRS 130 to be "Past Due" but has not escalated to "In Default" status.

In one embodiment, in response to the RRS 130 communicating a past-due payment status to the UDRT 240 on the UD, the UDRT 240 implements a lock screen to the UD (e.g., next time the phone is awakened from sleep state or powered ON). The UDRT 240 may disable non-emergency calls and consumer access to data usage. The UD may still be used for notifications and to access emergency functions. Further, the UDRT 240 may provide a Warning Lock Screen, similar to that of FIG. 3.

In one embodiment, the Warning Lock Screen includes a timer 330, which is operative to display the period of time (e.g., 5 minutes) a user associated with the account of the UD has to access the Internet to complete payment before being locked and/or restricted to a limited functionality.

Upon a user's selection on the user interface to "Pay" 332, the UDRT 240 enables data usage for a payment application or access to an Internet site allowing payment to replenish the account balance of the UD.

Upon a user's selection on the user interface to "Call Care" 334, the UDRT 240 enables calling a customer care or collections representative of the wireless telecommunication carrier under original agreement (e.g., EIP) with the UD.

Figure 4:
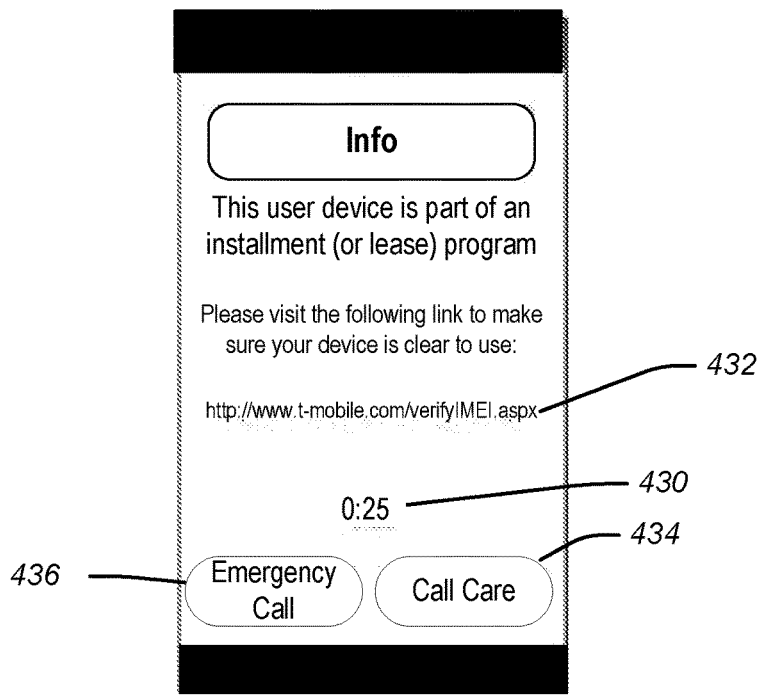
FIG. 4 illustrates an example Info Lock Screen.

FIG. 4 illustrates an example Info Lock Screen. It is a screen that may be displayed when functionality is temporarily and/or partially disabled. In one embodiment, a notification is sent to the account holder of the UD to indicate that a payment in connection with the EIP is not complete. Such notification may be sent in response to determining an unauthorized swapped SIM card. For example, the original user of the UD may have sold the UD to a buyer who installs a different SIM card.

In one embodiment, in response to the RRS 130 communicating detection of an unauthorized SIM card switch to the UDRT 240 on the UD, the UDRT 240 implements an Info Lock Screen at startup (e.g., next time the UD is used or turned ON). The UDRT 240 may disable non-emergency calls and/or data usage. Further, the UDRT may display an Info Lock screen, similar to that of FIG. 4.

In one embodiment, the Info Lock Screen includes a timer 430 operative to display the time (e.g., 5 minutes) a user of the UD has to access the Internet to complete payment before being locked and/or restricted to limited functionality.

Upon a user's selection on the user interface of the UD to access a verification link 432, the UDRT 240 may enable data usage and Internet browser functionality for the UD to access the verification page.

Upon a user's selection on the user interface of the UD to "Call Care" 434, the UDRT 240 enables calling to connect the UD to a customer care or collection representative of the wireless telecommunication carrier under original agreement with the UD.

Upon a user's selection of an "Emergency Call" 436 on the user interface of the UD, the lock screen may automatically dial a local emergency number or provide a keypad for dialing an emergency number, (e.g., 911).

Figure 5:
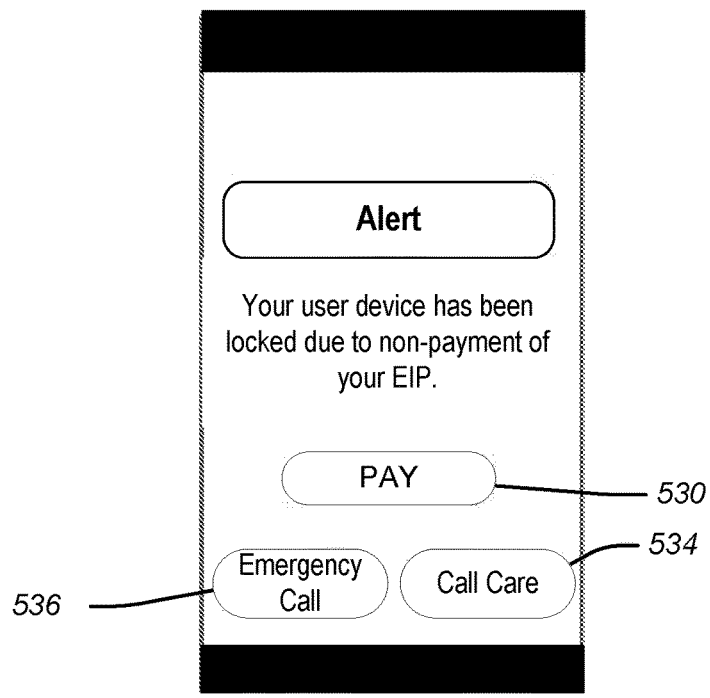
FIG. 5 illustrates an example Alert Lock Screen.

FIG. 5 illustrates an example Alert Lock Screen. It is a screen that is displayed while functionality is partially disabled because of a trigger event. For example, the UD payment status is "In Default" or the user has repeatedly ignored previous Warning and/or Info Lock screens, similar to those of FIGS. 3 and 4, respectively. In one embodiment, in response to the RRS 130 communicating an "In Default" status to the UDRT 240 on the UD, the UDRT 240 implements a lock screen (e.g., next time the UD is used). The UDRT 240 may disable non-emergency calls and/or data usage. Further, the UDRT 240 may provide an Alert Lock Screen, similar to that of FIG. 5.

Upon a user's selection on the user interface of the UD to "Pay" 530, the UDRT 240 may enable data usage for a payment application and/or for an Internet site allowing payment. Upon a user's selection on the user interface to "Call Care" 534, the UDRT 240 enables calling to connect the UD to a customer care or collection representative of the wireless telecommunication carrier under original agreement in connection with the UD.

Upon a user's selection of an "Emergency Call" 536 on the user interface of the UD, the lock screen may provide a keypad for dialing an emergency number, (e.g., 911).

Figure 6:
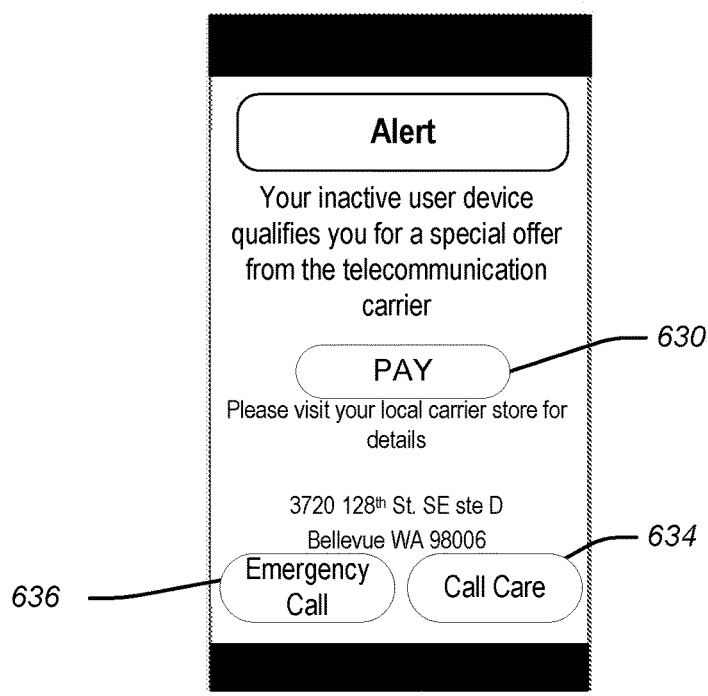
FIG. 6 illustrates an embodiment where an Alert Lock Screen that may provide notification of incentives for returning or reactivating device with payment.

FIG. 6 illustrates an embodiment where an Alert Lock Screen that may provide a notification of one or more incentives for returning or reactivating the device. In one embodiment, in response to the RRS 130 communicating a trigger event (e.g., "In Default" status) to the UDRT 240 on the UD, the UDRT 240 implements a lock screen (e.g., next time the UD is used). The UDRT 240 may disable non-emergency calls and/or data usage. Further, the UDRT 240 may provide an Alert Lock Screen, such as that of FIG. 6, which provides the user a notification of a possible incentive for returning or paying to reactivate the UD. An incentive may be an attractive plan with the telecommunication carrier, avoidance of a penalty, etc.

Upon a user's selection on the user interface of the UD to "Pay" 630, the UDRT 240 may enable data usage for a payment application and/or access to an Internet site allowing payment. Upon a user's selection on the user interface to "Call Care" 634, the UDRT 240 enables calling to connect the UD to a customer care or collection representative of the wireless telecommunication carrier under original agreement in connection with the UD.

Upon a user's selection of an "Emergency Call" 636 on the user interface of the UD, the lock screen may provide a keypad for dialing an emergency number, (e.g., 911).

Cross-Network Functionality

A UD may include a UDRT 240 that communicates with an RRS 130. In one embodiment, such communication is facilitated via Google Cloud Messaging (GCM). This platform provides for communication even when the device is from an alternate radio access network or Wi-Fi. For example, when the UD is turned ON and connected to a radio access network (e.g., 122), the UDRT 240 in the memory of the UD pings GCM to connect to the RRS 130 to provide various conditions of the UD, such as the IMSI of the presently installed SIM card of the UD and whether the UD is being used via Wi-Fi. Accordingly, the RRS 130 identifies the status of the UD (e.g., account past due, account in default, swapped SIM card detected) and then implements a "bad debt" reduction solution for the UD, based on the detected conditions.

Allowing E-911 Calls

In one embodiment, a lock screen (e.g., similar to that of FIG. 5) provides functionality for making emergency calls. Accordingly, the UDRT 240 may block non-emergency functionality while allowing to place an emergency call by selecting an appropriate option on the display of the UD.

Allowing Payment Options and Other Links

In some embodiments, a lock screen (e.g., similar to that of FIG. 4) may provide functionality for making online payments within an Internet browser. For example, a user click on a provided link 432, which may invoke a predetermined link on an Internet browser of the UD. Accordingly, the UDRT 240 may block non-emergency functionality while allowing the user to select an option on the lock screen, allowing the user to make a payment. Accordingly, a user is provided the opportunity to restore (e.g., full or partial) UD functionality using the very UD that is blocked from regular functionality.

Allowing Communication with Customer Care/Collections Representative

In some embodiments, a lock screen (e.g., similar to that of FIGS. 5 and 6) may provide functionality for communicating with a customer care or collections representative, so that the user may arrange payments or resolve other related problems. Upon resolution, the UDRT 240 of the UD may reactivate the UD to full functionality.

Lock Screen Timer

In one embodiment, a lock screen (e.g., similar to that of FIGS. 3 and 4) may include a timer (e.g., 330 and 430, respectively) for displaying the amount of time the lock screen limits functionality. Additionally, in some cases, in which an Alert Lock Screen is in effect and device functionality is limited to emergency calls, the UDRT 240 may allow a limited period of time to access the Internet for the purpose of making a payment. Accordingly, the lock screen timer may display the time remaining during which the user will be allowed partial functionality for making payments. In one embodiment, when the predetermined time period expires, the UD is blocked from using the communication network of a telecommunication carrier. In various embodiments, such block may be implemented at the communication network side and/or the UD.

Redirecting Calls and Data to a Wireless Telecommunication Carrier

In some embodiments, instead of implementing a lock screen, the UDRT 240 may redirect non-emergency calls to the wireless telecommunication carrier presently under contract. For example, the call may be routed to a customer care or collections representative. In response to a user attempting to make a non-emergency call, the UDRT 240 may redirect the call to an operator of the wireless telecommunication carrier under contract. In one embodiment, a notification is sent to the account holder (e.g., registered user) of the UD to inform of the reason for redirecting the call (e.g., account past due, account in default, unauthorized SIM card detected). In various embodiments, the notification may be sent via SMS and/or GCM directly to the UD, e-mail, regular mail, etc. In various embodiments, the e-mail and/or the address of the account holder of the user device may be provided by the CRM server 160 or the billing server 150.

In one embodiment, the UDRT 240 may additionally redirect all Internet browsing to a customer care or collections Internet sites, or applications of the wireless telecommunication carrier under contract. For example, in response to a user attempting to access an Internet page within a browser, the UDRT 240 may instead load an Internet page of the wireless telecommunication carrier that is still under contract. In addition, a notification may be sent to the user to inform the user of the reason for the redirection (e.g., account past due, account in default, unauthorized SIM card detected).

In one embodiment, in response to the RRS 130 communicating a "bad debt" status to the UDRT 240 on the UD 200, the UDRT 240 implements a lock screen according to predetermined settings of the UDRT 240. For example, the next time the UD 200 is used to place a call or attempts to navigate to an Internet page within a browser application, a lock screen is displayed on the UD 200.

For example, in response to a user attempting to make a non-emergency call on the UD, the UDRT 240 may provide a notification on the display of the UD to the user to inform of the reason for redirecting the call (e.g., account is past due, account is in default, an unauthorized SIM card is detected, etc.).

In one embodiment, upon determining that there is a trigger event, the UDRT 240 redirects any non-emergency call to a customer care or collections number of the wireless telecommunication carrier under original agreement in connection with the UD.

In one embodiment, in response to a user's attempt (on the UD) to access an Internet page within a browser application, the UDRT 240 may display a notification on the UD to inform of the redirection and/or the reason for the redirection (e.g., the account is past due, the account is in default, an unauthorized SIM card is detected, etc.).

In one embodiment, the UDRT 240 redirects to a customer care or collections Internet page of the wireless telecommunication carrier under original agreement in connection with the UD. Alternatively or in addition, the UDRT 240 may open an application on the UD that allows repayment.

Disabling Commonly Used Functionality

In some embodiments, instead of or in addition to implementing a lock screen, the UDRT 240 may disable a commonly used feature or application. To that end, the UDRT 240 may passively detect the most frequently used features of the subject UD, such as a camera application or browser application, or may query a database in the device's memory 216 that stores UD feature usage information for a predefined time period.

In response to a trigger event, such as a detected "bad debt" condition, the UDRT 240 may determine the most frequently used predetermined number of features on the particular UD and block these features. In various embodiments, the number of features that are blocked may be one or several. Further, the number of features that are blocked may escalate based on the severity of the trigger event. In one embodiment, the UDRT 240 may send a notification to the account holder to inform the user of the reason for blocking the one or more features (e.g., account past due, account in default, unauthorized SIM card detected).

For example, the UDRT 240 may (e.g., passively) detect most frequently used features applications. By way of non-limiting example, such features/applications may include various games, a music player, an Internet browser, social networking applications, camera, a navigation application, etc.

Thus, in response to the RRS 130 messaging a trigger event (e.g., communicating a "bad debt" status to the UDRT 240 of the UD 200), the UDRT 240 implements a lock screen in the UDRT 240. For example, the lock screen may be displayed at startup (e.g., the next time the UD is turned ON or simply used to make calls, or used to navigate to an Internet page within a browser application).

In one embodiment, the UDRT 240 may query a database in the UD's memory 216, providing usage details. Alternatively or in addition, the UDRT 240 may have previously detected a most frequently used application.

In response to a user attempting to use a most frequently used application on the UD, the UDRT 240 may block functionality for one or more commonly used application(s). Instead, the UDRT 240 may display a notification on the UD to inform of the reason for blocking the feature (e.g., the account is past due, the account is in default, an unauthorized SIM card is detected, etc.).

Restoring Functionality to a User Device

In one embodiment, a UD that has been previously limited in functionality (e.g., restricted and/or blocked) can be restored in functionality. For example, the UD may have been previously restricted and/or blocked due to a trigger event (e.g., determination that the UD is used beyond the scope of the original agreement with a wireless telecommunication carrier). One such scenario may be in the context of a "bad debt" condition. A UD 200 previously locked by its UDRT 240 may be unlocked if the account assigned to the UD is replenished.

In some embodiments, lock screens may provide an interface for paying past-due amounts, including paying over the phone, paying within an Internet browser application, or paying within a specific application provided by the wireless telecommunication carrier.

For example, a user may make a payment at a store related to the wireless telecommunication carrier or over the phone with a customer care/collections representative. When a user replenishes the account (e.g., makes a payment that brings the subscriber account into good standing), the billing server 150 may update the RRS 130, which in turn communicates with the UDRT 240 of the UD 200 (e.g., via GCM) to unlock (e.g., restore one or more features) of the UD.

In one embodiment, while the UD is locked, a user may make a payment within a mobile application, such as an Internet browser or an account application provided by the wireless telecommunication carrier. When the UDRT 240 receives a confirmation from a browser or upon replenishment of the outstanding balance on the account, the UDRT 240 may unlock the UD and communicate with the RRS 130 (e.g., via GCM) to confirm that payment has been made and that the account is replenished.

Alternatively, the UDRT 240 may wait for the billing server 150, which keeps track of the account status of the UD, to update the RRS 130. The RRS 130 may in turn communicate with UDRT 240 (e.g., via GCM) to unlock the UD if the payment has brought the account of the UD to a good standing.

However, in one scenario, a UD may have been locked because the RRS 130 had detected an unauthorized SIM card swap. In this case, upon determining that the original (i.e., authorized) SIM card is in the UD SIM card slot and upon the UD being turned ON and connected to a network (e.g., 122 or 170), the UDRT 240 may update the RRS 130 with the SIM Card's IMSI (e.g., via GCM). If the RRS 130 verifies the IMSI, the RRS 130 may communicate with the Recovery Tool of the UD (e.g., via GCM) to unlock the UD.

In a related scenario, a user may wish to restore service to a UD that has been locked because of an unauthorized SIM card swap. If so, the user may go to a store related to the wireless telecommunication carrier or call a customer care/collections representative to unlock the UD and activate the service with the wireless telecommunication carrier using the new SIM card. After the IMEI of the presently installed SIM card of the UD is received by the customer care representative of the wireless telecommunication carrier and the account is activated, the billing server 150 may inform the RRS 130 the new IMSI assigned to the UE's IMEI. The RRS 130 may then communicate with the Recovery Tool of the UD (e.g., via GCM) to unlock the UD and restore service to the wireless telecommunication carrier.

EXAMPLE USE CASES

As discussed above, the method and system can be applied in different scenarios. Several use cases are provided below by way of example only and not limitation. In some examples, process flow charts are used. The call flow processes 700 to 1400 are illustrated as a collection of blocks in logical flows, which each represents a sequence of operations that can be implemented in hardware, software, or a combination thereof.

In the context of software, the blocks represent computer-executable instructions that, when executed by one or more processors, perform the recited operations. Generally, computer-executable instructions may include routines, programs, objects, components, data structures, and the like that perform particular functions or implement particular abstract data types.

The order in which the operations are described is not intended to be construed as a limitation, and any number of the described steps can be combined in any order and/or performed in parallel to implement the process. For discussion purposes, the scenarios described below are with reference to the architecture 100 of FIG. 1 and the displays of FIGS. 3 to 6.

Use Case 1

Example Payment Reminder

Figure 7:
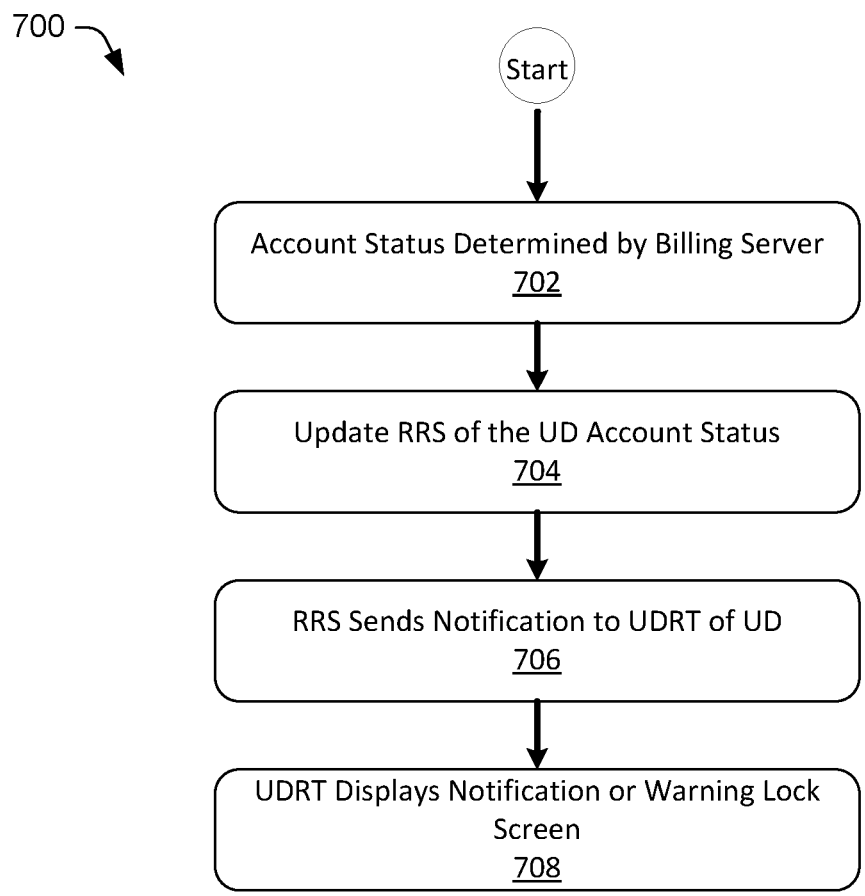
FIG. 7 illustrates a high level example process flow for a payment reminder.

FIG. 7 illustrates a high level example process flow for a payment reminder. For example, a user may purchase a new UD under the EIP of the wireless telecommunication carrier 122. The user fails to make a monthly payment. Consequently, the account associated with the EIP becomes past-due.

At block 702, the billing system (represented by the billing server 150) determines the account status of the UD (e.g., 102(*n*)).

At block 704, the billing system updates the RRS 130 with the account status of the UD. In various embodiments, the update may be performed periodically or upon the billing server 150 determining that the account has a past-due payment status.

At block 706, the RRS 130 sends a notification of past-due payment status to the Device Recovery Tool of the UD (e.g., 102(*n*)). In various embodiments, the notification to the UD may be sent immediately or at a predetermined time.

At block 708, in various embodiments, the UDRT displays a notification (e.g., "Payment Past Due") or a Warning Lock Screen, similar to that of FIG. 3, to the UD 102(*n*), depending on the seriousness of the account status. In various embodiments, the notification on the display of the UD may be provided when the notification is received from the RRS 130 or next time the UD is turned ON.

Use Case 2

Example Notification on SIM Swap

Figure 8:
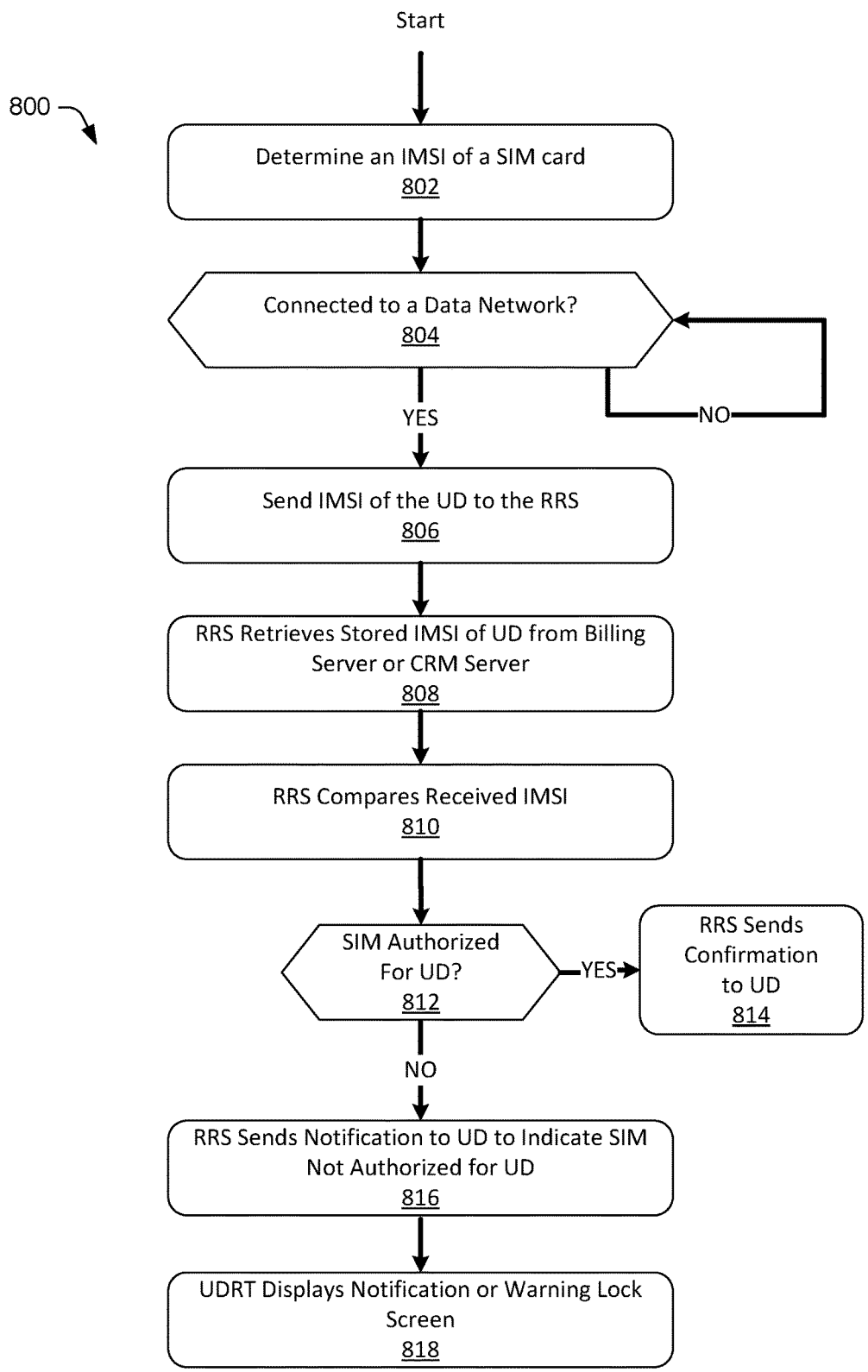
FIG. 8 illustrates a high level example process flow for a notification on a subscriber identity module (SIM) swap.

FIG. 8 illustrates a high level example process flow for a notification on a SIM swap. For example, a user may purchase a new UD under the EIP of the wireless telecommunication carrier 122 (i.e., the first radio access network).

Before EIP has been paid off, the user sells the UD (e.g., 102(*n*)) to another person, e.g., via Craigslist, eBay, etc., or simply decides to switch to another mobile plan. The (e.g., new) user swaps the original SIM card for another SIM card.

At block 802, the UDRT of the UD (e.g., 102(*n*)) determines an IMSI of the SIM card presently installed on the UD. For example, such operation may be performed every time the UD is turned ON (e.g., startup).

At block 804, the UDRT determines whether the UD is connected to a data network. The data network is not limited to the radio access network 122 of the original EIP. Rather, the data network may be any radio access network, such as the alternate radio access network 170 or Wi-Fi. Accordingly, the UDRT of the UD (e.g., 102(*n*)) communicates the identified SIM card's IMSI to the RRS 130 (e.g., via a non-cellular messaging intermediary, such as GCM), which may be accessed via a network that is different from the radio access network 122, such as the second radio access network 170 or via Wi-Fi.

At block 808, in various embodiments, the RRS retrieves the IMSI of the UD from the billing server 150 or the CRM server 160. The retrieved IMSI (whether from the billing server 150 or the CMR Server 160) is collectively referred to herein as the stored IMSI.

At block 810, the RRS 130 compares the IMSI received from the UD and compares it with the stored IMSI. At block 812, the RRS 130 determines whether the received IMSI is authorized for the UD (e.g., 102(*n*)) based on the comparison.

If the SIM card is authorized (i.e., "YES", at decision block 812), no further action is taken by the RRS 130. In one embodiment, at block 814, the RRS 130 sends a confirmation to the UDRT of the UD (e.g., 102(*n*)), indicating that the SIM card is authorized.

If the SIM card is not authorized (i.e., "NO", at decision block 812), at block 816, the RRS 130 sends a notification the UDRT 240 of the UD (e.g., 102(*n*)), to indicate that the SIM card is not authorized for this UD (e.g., 102(*n*)).

At block 818, in various embodiments, immediately or upon the next turning ON of the UD, the UDRT 240 of the UD (e.g., 102(*n*)) implements an Info Lock screen, similar to that of FIG. 4, which limits device functionality. In one embodiment, the screen informs the user of the installment plan related to the UD to encourage the user to replenish the account.

Use Case 3

Example Lock Device

FIG. 9 illustrates a high level example process flow for locking a UD. For example, a user may purchase a new UD under the EIP of the wireless telecommunication carrier 122 (i.e., the first radio access network). The user then fails to make an expected (e.g., monthly) payment. Consequently, the account associated to the UD (e.g., 102(n)), becomes past-due for exceeding a first time period.

At block 902, the billing system (represented by the billing server 150) determines the account status of the UD (e.g., 102(n)).

At block 904, the billing system (i.e., billing server 150) updates the RRS 130 with the account status of the UD. In various embodiments, the update may be performed periodically or upon determining that the account has a past-due payment status (past a first time period).

At block 906, the RRS 130 sends a notification of a past-due payment status to the Device Recovery Tool of the UD (e.g., 102(n)).

At block 908, in various embodiments, the UDRT displays a notification (e.g., "Payment Past Due" in the form of a Warning Lock Screen), similar to that of FIG. 3, to the UD 102(n), depending on the seriousness of the account status. In various embodiments, the notification may be displayed when the notification is received from the RRS 130 or the next time the UD is turned ON.

At block 910, the billing server 150 determines whether the account is replenished at least in part during a second time period. If so, (i.e., "YES" at decision block 910), the process continues with block 912 of FIG. 9B, discussed below.

At block 912, the billing server 150 sends a notification to the RRS 130, indicating the account status. At block 914, the RRS 130 determines, based on the received notification from the billing server 150, whether the account is satisfied in full or in part. If the account is satisfied in full, the process continues with block 918, where the RRS 130 sends a message to the UD, wherein the message includes instructions to the UDRT 240 of the UD. In one embodiment, the message includes instructions for the UDRT 240 to display on the display of the UD a notification that the account has been replenished in full and that functionality is restored. To that end, at block 918, all restrictions are removed to restore functionality.

Returning to block 914, upon the RRS 130 determining, that the account has been satisfied in part (e.g., the user has only paid part of the remaining balance or has provided an assurance that the account will be satisfied within a predetermined time period, the process continues with block 920, where the RRS sends a message to the UD including instructions to the UDRT 240 of the UD. In one embodiment, the message includes instructions for the UDRT 240 to display on the display of the UD a notification that the account has been replenished only in part and that part of the functionality is restored. To that end, at block 922, a predetermined number of restrictions are removed to restore functionality of the UD in part. For example, a predetermined number (e.g., 3) of most frequently used features may be restored, while the remaining disabled featured remain disabled until the account is replenished. In one embodiment, more features are activated, the more closely replenished the account is.

Figure 9A:
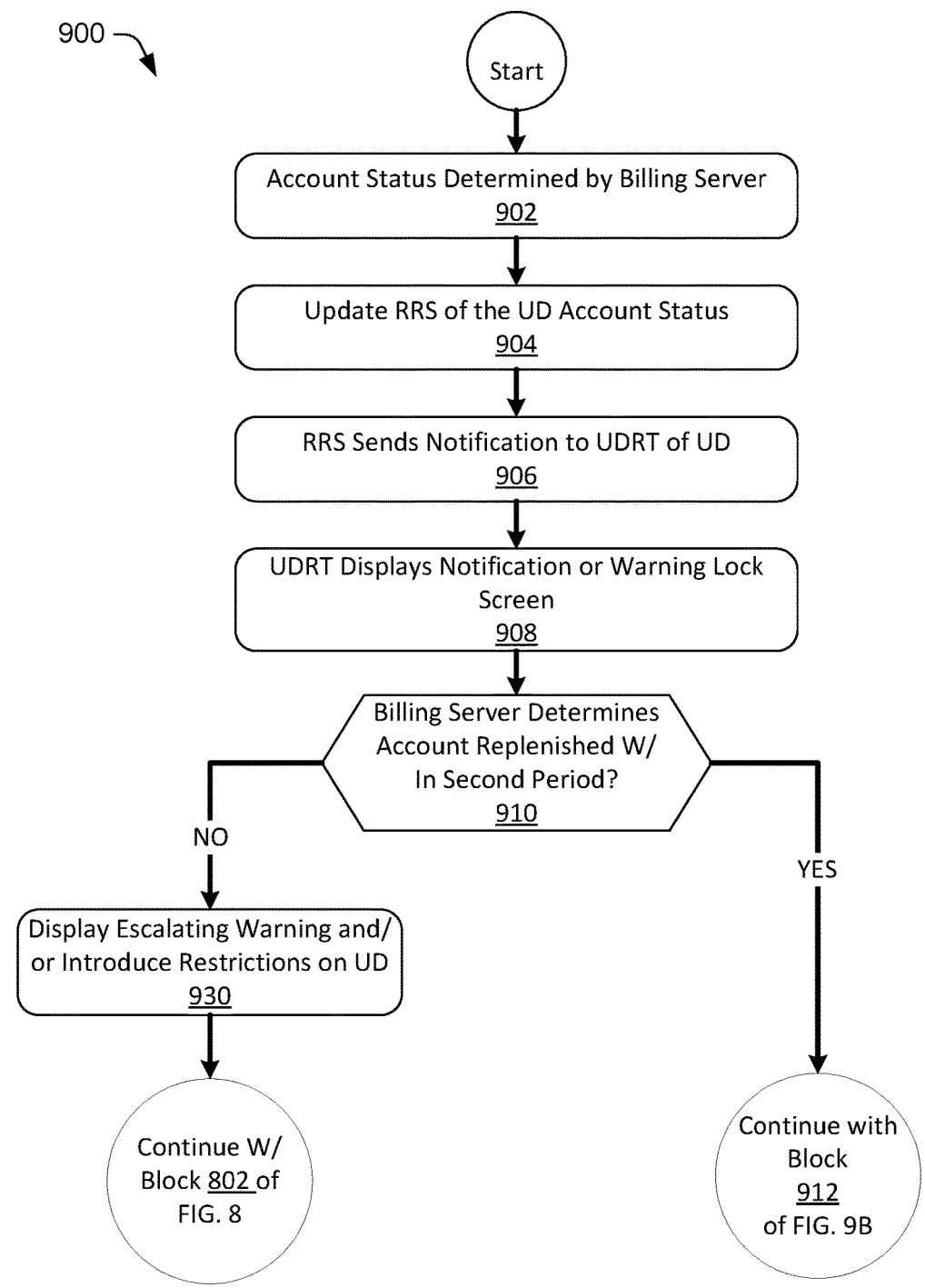
FIG. 9A illustrates a high level example process flow for locking a user device.
Figure 9B:
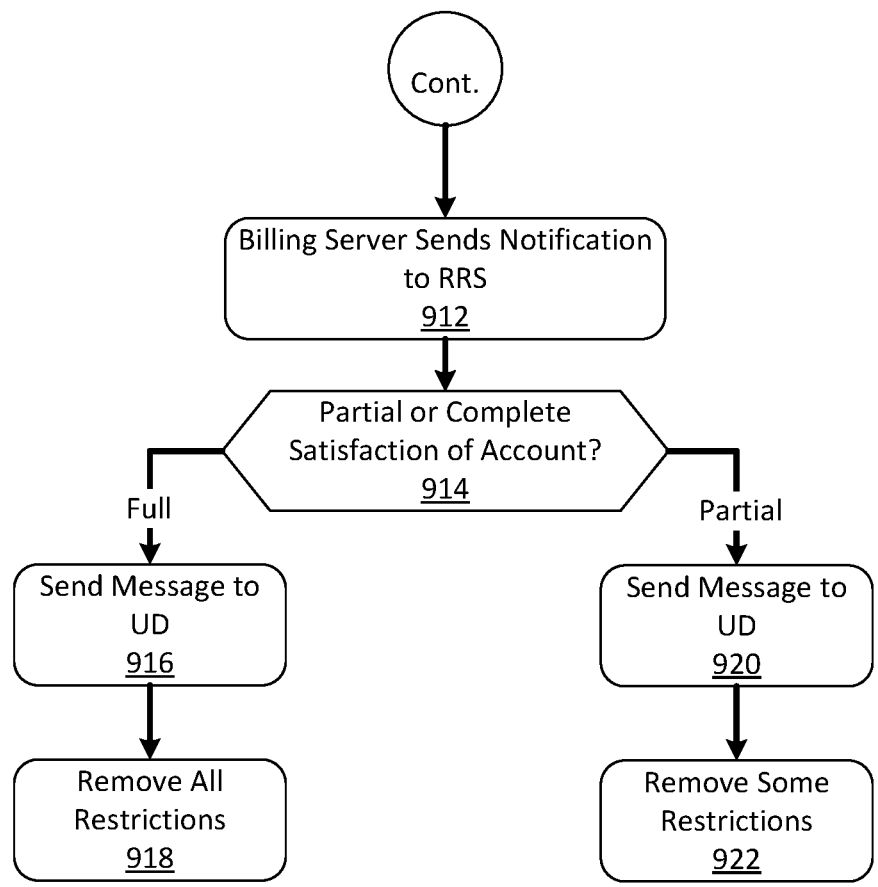
FIG. 9B illustrates a high level example process flow removing restrictions on a user device

Returning back to block 910 of FIG. 9A, upon the billing server 150 determining that the account is not replenished (i.e., "NO" at decision block 910), the process continues with block 930. For example, the user may ignore the "Payment Past Due" notifications and becomes behind at a second period (e.g., two months behind on payments), and the account of the user escalates to a second state (e.g., "In Default").

At block 930, the RRS sends a notification to the UDRT 240 of the UD, such that the UDRT displays an escalated warning and/or introduces additional restrictions on the UD. In one embodiment, the wireless telecommunication carrier of the first radio access network 122 disconnects the UD (e.g., 102(n)) from network 122 service of the original telecommunication carrier.

In one embodiment, after block 930 the process 900 continues with blocks that are similar to that of process 800 of FIG. 8, which are not repeated here for brevity. Instead, some salient differences are discussed below.

For example, the UDRT 240 of the UD (e.g., 102(n)) determines an IMSI of the SIM card presently installed on the UD. For example, such operation may be performed every time the UD is turned ON (e.g., startup). Thus, if the UD (e.g., 102(n)) is continued to be used with a swapped-in mobile virtual network operator (MVNO) SIM card, or simply uses Wi-Fi, the situation escalates further. It should be noted that the unauthorized SIM card may be part of the original radio access network 122 of the telecommunication carrier (that has the original EIP) or may be part of the second radio access network 170.

For example, at block 930, the billing system, represented by billing server 150, updates (e.g., sends a message to) the RRS 130 to indicate that an "In Default" status is reached because the account in connection with the UD (e.g., 102(n)) has not been replenished for a second time period. Further, after going through blocks 802 to 812 of process 800 and upon determining that the SIM card is not authorized (i.e., "NO", at decision block 812), at block 816, the RRS 130 escalates the status of the UD by sending a notification to the UDRT 240 of the UD (e.g., 102(n)), to indicate that an "In Default" status is reached and the SIM card is not authorized for this UD (e.g., 102(n)) (e.g., block 816).

Upon receiving the notification, the UDRT 240 of the UD (e.g., 102(n)) implements an Alert Lock Screen, similar to that of FIG. 5, allowing the user of the UD (e.g., 102(n)) to have a predetermined period of time (e.g., 5 minutes) to access the internet to complete payment before being locked and/or restricted to a further escalated level of limited functionality of the UD (e.g., 102(n)).

Use Case 4

Example Incentive to Return User Device

Figure 10:
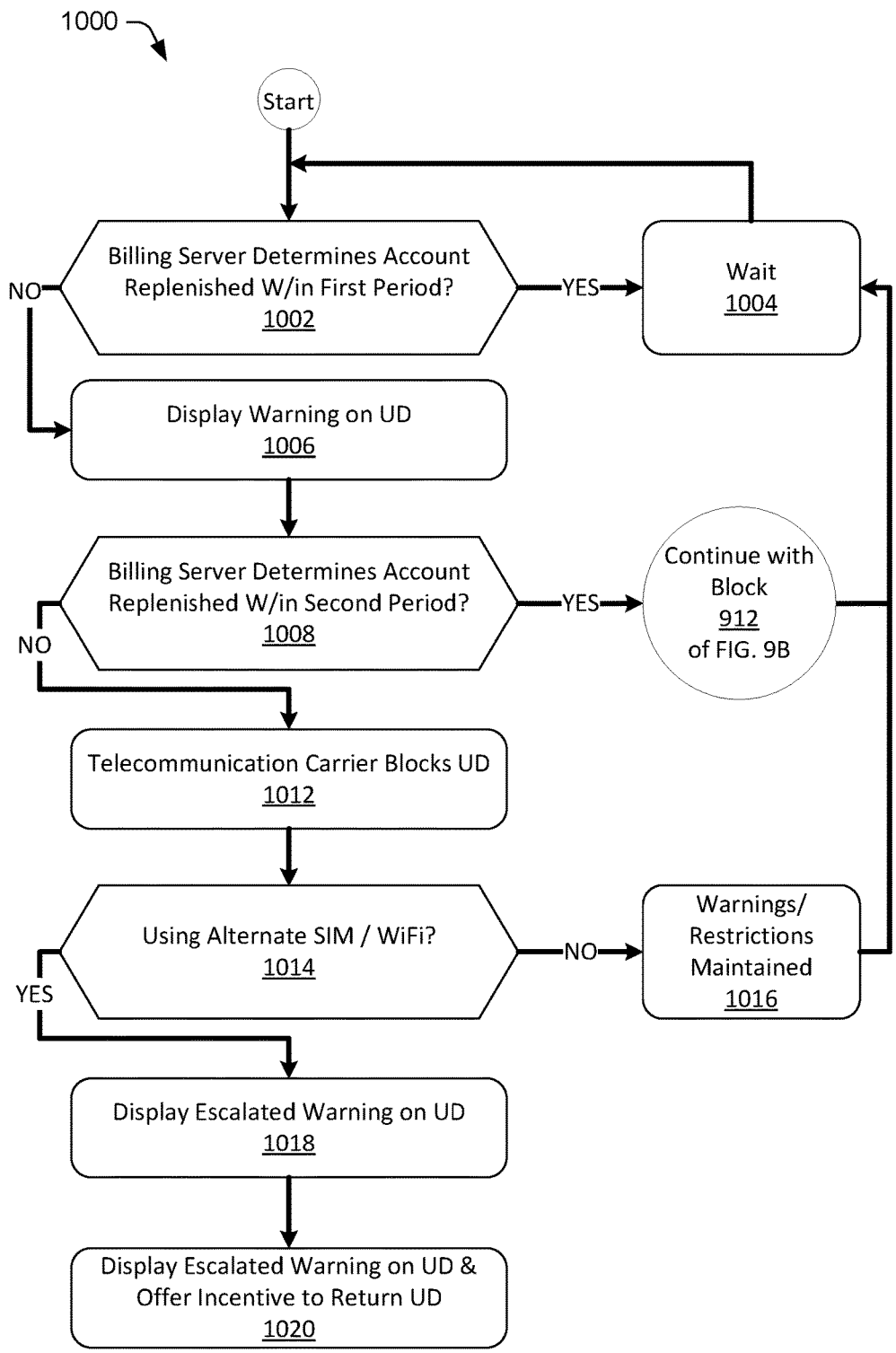
FIG. 10 illustrates a high level example process flow for providing an incentive to return a user device to a telecommunication carrier.

FIG. 10 illustrates a high level example process flow for providing an incentive to return a UD to a telecommunication carrier. For example, a user may purchase a new UD under the EIP of the wireless telecommunication carrier 122 (i.e., the first radio access network). The user then fails to make expected (e.g., monthly) payments. Consequently, the account associated to the UD (e.g., 102(n)), becomes past-due for a first time period.

At block 1002, the billing server 150 determines whether an account associated with a UD is replenished during a first period. Put differently, the billing server 150 determines whether a timely payment has been made for the UD with respect to the EIP. If so, (i.e., "YES", at decision block 1002), at block 1004 the billing server 150 waits a predetermined time period before performing the next account status inquiry. In one embodiment the wait is equivalent to the first time period (e.g., one month).

Upon determining, by the billing server 150, that a timely payment within the first period is not made ("NO", at decision block 1002), the process continues with block 1006.

At block 1006, an appropriate warning is displayed on the UD, similar to that of FIG. 3 or 4. Such notification is facilitated by the billing server 150 updating the RRS 130 with the account status of the UD. The RRS 130 sends a message (e.g., first message) that includes instructions, to the UD. For example, the message includes a notification of the account status (e.g., a past-due payment status) to the UDRT 240 of the UD. The UDRT 240 then displays the warning (e.g., first warning) on a display of the UD. In various embodiments, the warning may provide an opportunity to replenish the account. In one embodiment, one or more features may be disabled on the user device, as discussed herein. A second period may be displayed on the UD, indicating the time remaining (i.e., second time period) until the account status escalates to a more severe level.

At block 1008 the billing server 150 determines whether the account associated with the UD is replenished (at least in part) during the second period. If so, (i.e., "YES", at decision block 1008), at block 1010 the billing server 150 sends a message to the RRS 130 to indicate that the account of the UD is replenished (e.g., at least in part). The process continues with block 912 of FIG. 9B, discussed previously, and therefore not repeated here for brevity.

Returning to decision block 1008 of FIG. 10A, upon the billing server 150 determining that the account has not been replenished during the second period, (i.e., "NO", at decision block 1008), at block 1012 the billing server 150 sends a notification to the RRS 130 to inform that the UD is now in a second state (e.g., "In Default"). For example, the user may ignore the "Payment Past Due" notification(s) and becomes behind at a second period (e.g., two months behind on payments), and the account of the user escalates to this second state (e.g., "In Default").

Consequently, in one embodiment, the wireless telecommunication carrier of the radio access network 122 (that is under the EIP) blocks (e.g., disconnects) the UD (e.g., 102(n)) from network 122 service of the original telecommunication carrier.

At block 1014, it is determined whether the UD (e.g., 102(n)) is continued to be used with a swapped-in MVNO SIM card and/or via Wi-Fi. For example, a user may attempt to use the UD on the radio access network 122 of the original telecommunication provider at a lower rate, or simply use the UD on an alternate radio access network 170 from an alternate telecommunication provider. Whether an unauthorized SIM card is used has been described in the context of the discussion of process 800 and will therefore not be repeated here for brevity. It should be noted that, in one embodiment, the UDRT 240 is operative to determine from the transceiver 204 whether the UD is being used through a Wi-Fi connection.

If an unauthorized SIM card (e.g., on an alternate network) or Wi-Fi is not being used (i.e., "NO", at decision block 1014), at block 1016 any present warnings and/or restrictions are maintained.

However, if an unauthorized SIM card (e.g., on an alternate network) or Wi-Fi is being used (i.e., "YES", at decision block 1014), then the status of the account of the UD escalates. At block 1018, the billing system, represented by billing server 150, updates the RRS 130 with an "In Default" status in connection with the UD. Consequently, the RRS 130 sends a message (e.g., third message) that includes instructions to the UD. For example, the message includes a notification of "In Default" status to the UDRT 240 of the UD.

At block 1020, in various embodiments, the UDRT 240 implements an Alert Lock Screen, similar to that of FIG. 6, limits (or further limits) device functionality, and/or informs the user of the UD of an offer that provides an incentive to return or reactivate the UD. These actions of block 1020 are performed by the UDRT 240 immediately, or upon the next usage of the UD. An incentive may be an attractive rate to use the services of the telecommunication carrier and/or a mitigated penalty if the UD is returned in a predetermined period. In one embodiment, the Alert Lock Screen displays the nearest store address based on the original provided billing address and/or the present location of the device based on a global positioning (GPS) sensor and/or cellular triangulation.

Use Case 5

Redirect Calls/Data to Original Wireless Telecommunication Carrier

Figure 11:
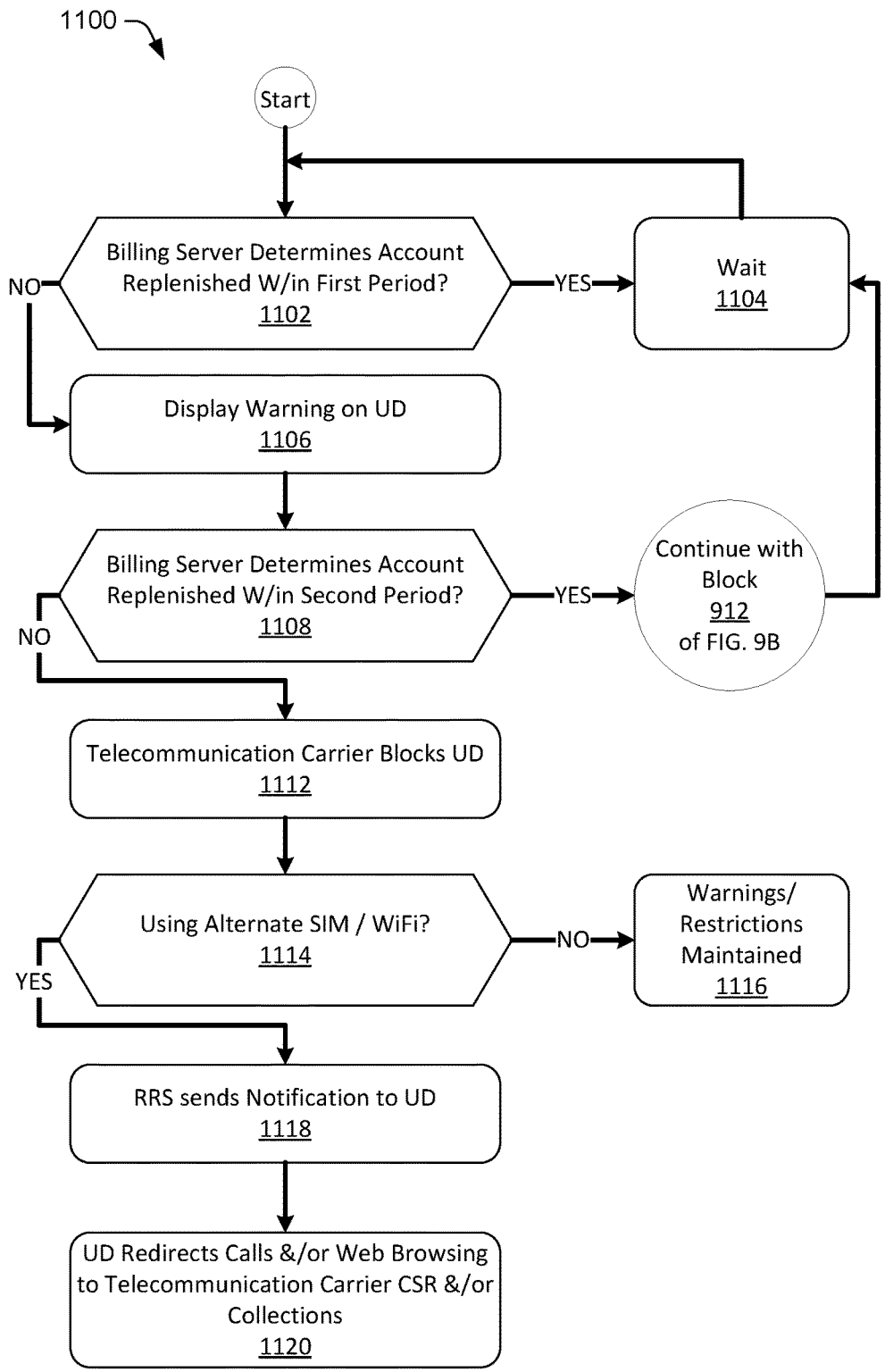
FIG. 11 illustrates a high level example process flow for redirecting calls and/or data to an original telecommunication carrier.

FIG. 11 illustrates a high level example process flow for redirecting calls and/or data to the original telecommunication carrier. For example, a user may purchase a new UD under the EIP of the wireless telecommunication carrier 122 (i.e., the original radio access network). The user then fails to make expected (e.g., monthly) payments. Consequently, the account associated to the UD (e.g., 102(n)), becomes past-due for a first time period.

At block 1102, the billing server 150 determines whether an account associated with a UD is replenished during a first period. Put differently, the billing server 150 determines whether a timely payment has been made for the UD with respect to the EIP. If so, (i.e., "YES", at decision block 1102), at block 1104 the billing server 150 waits a predetermined period before performing the next account status inquiry. In one embodiment the wait is equivalent to the first period (e.g., one month).

Upon determining, by the billing server 150, that a timely payment within the first period is not made ("NO", at decision block 1102), the process continues with block 1106.

At block 1106, an appropriate warning is displayed on the UD, similar to that of FIG. 3 or 4. Such notification is facilitated by the billing server 150 updating the RRS 130 with the account status of the UD. The RRS 130 sends a notification of a past-due payment status to the UDRT 240 of the UD. The UDRT 240 then displays the warning on a display of the UD. In various embodiments, the warning may provide an opportunity to replenish the account. In one embodiment, one or more features may be disabled on the user device, as discussed herein. A second period may be displayed on the UD, indicating the time remaining (i.e., second time period) until the account status escalates to a more severe level.

At block 1108 the billing server 150 determines whether the account associated with the UD is replenished during the second period. If so, (i.e., "YES", at decision block 1108), at block 1110 the billing server 150 sends a notification to the RRS 130 to indicate that the account of the UD is replenished. The process continues with block 912 of FIG. 9B, discussed previously, and therefore not repeated here for brevity.

Returning to block 1108 of FIG. 11, upon the billing server 150 determining that the account has not been replenished during the second period, (i.e., "NO", at decision block 1108), at block 1112 the billing server 150 sends a notification to the RRS 130 to inform that the UD is now in a second state (e.g., "In Default"). For example, the user may ignore the "Payment Past Due" notification(s) and becomes behind at a second period (e.g., two months behind on payments), and the account of the user escalates to this second state (e.g., "In Default").

Consequently, the wireless telecommunication carrier of the radio access network 122 (that is under the EIP) blocks (e.g., disconnects) the UD (e.g., 102(n)) from network 122 service of the original telecommunication carrier.

At block 1114, it is determined whether the UD (e.g., 102(n)) is continued to be used with a swapped-in MVNO SIM card and/or via Wi-Fi.

If an unauthorized SIM card (e.g., on an alternate network) or Wi-Fi is not being used (i.e., "NO", at decision block 1114), at block 1116 any present warnings and/or restrictions are maintained.

However, if an unauthorized SIM card (e.g., on an alternate network) or Wi-Fi is being used (i.e., "YES", at decision block 1114), then the status of the account of the UD escalates.

At block 1118, the billing system, represented by billing server 150, updates the RRS 130 with an "In Default" status in connection with the UD. Consequently, the RRS 130 sends a notification of "In Default" status to the UDRT 240 of the UD.

At block 1120, upon receiving the notification from the RRS 130, the UDRT 240 redirects calls and/or data. For example, the UDRT 240 augments UD functionality such that outgoing calls from the UD, including those made via an alternate network, such as the second radio access network 170, are redirected to a customer care or collections team representative of the wireless telecommunication carrier of the first (e.g., original) radio access network 122. In one embodiment, the augmented functionality is such that some or all Internet browsing is redirected to a payment/collections Internet site.

Use Case 6

Disable Most Frequently Used Features

Figure 12:
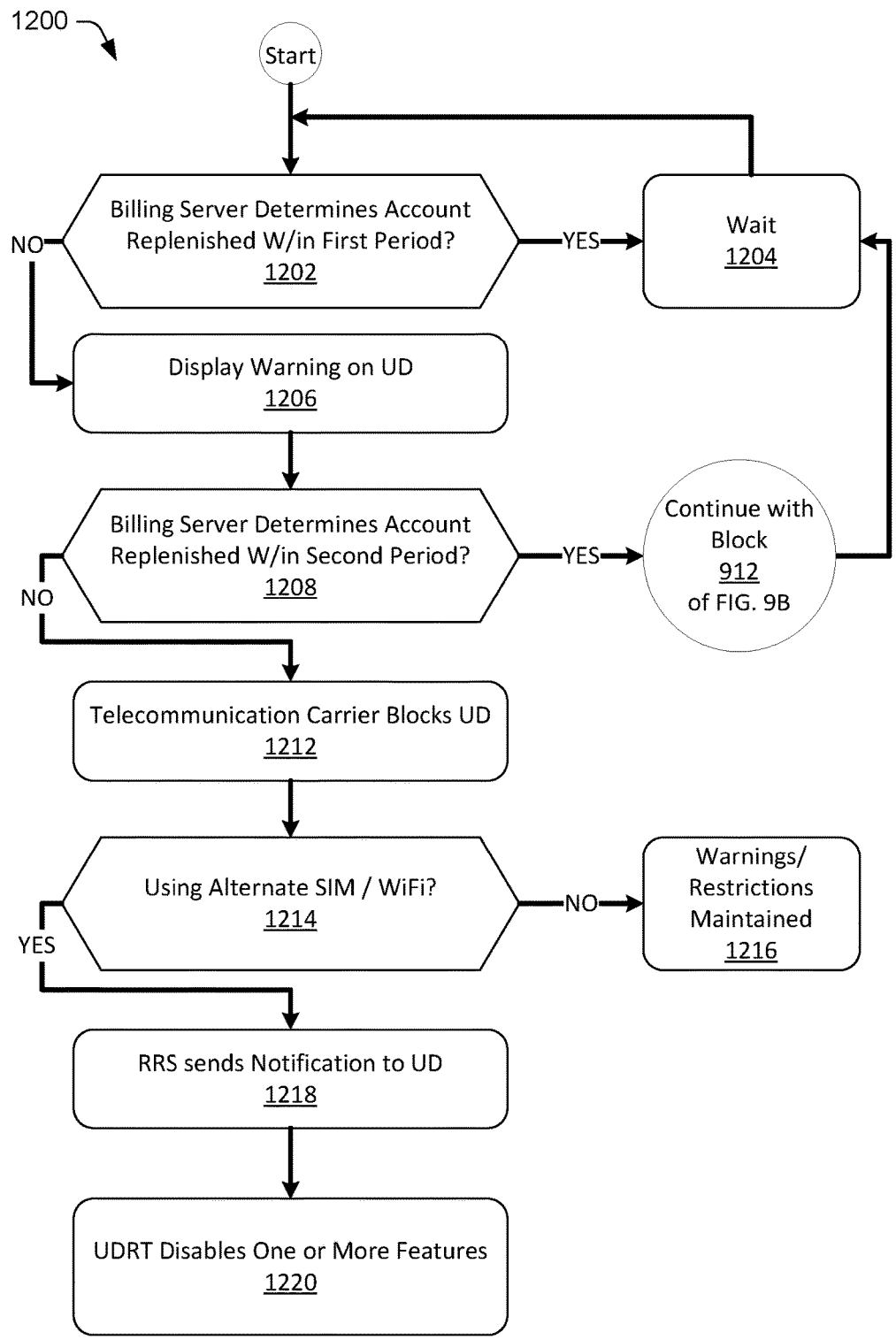
FIG. 12 illustrates a high level example process flow for disabling the most frequently used features of a user device.

FIG. 12 illustrates a high level example process flow for disabling the most frequently used features of a UD upon determining that is being used in an unauthorized way. For example, a user may purchase a new UD under the EIP of the wireless telecommunication carrier 122 (i.e., the original radio access network). The user then fails to make expected (e.g., monthly) payments. Consequently, the account associated to the UD (e.g., 102(n)), becomes past-due for a first time period.

At block 1202, the billing server 150 determines whether an account associated with a UD is replenished during a first period. Put differently, the billing server 150 determines whether a timely payment has been made for the UD with respect to the EIP. If so, (i.e., "YES", at decision block 1202), at block 1204 the billing server 150 waits a predetermined period before performing the next account status inquiry. In one embodiment the wait is equivalent to the first period (e.g., one month).

Upon determining, by the billing server 150, that a timely payment within the first period is not made ("NO", at decision block 1202), the process continues with block 1206.

At block 1206, an appropriate warning is displayed on the UD, similar to that of FIG. 3 or 4. Such notification is facilitated by the billing server 150 updating the RRS 130 with the account status of the UD. The RRS 130 sends a notification of a past-due payment status to the UDRT 240 of the UD. The UDRT 240 then displays the warning on a display of the UD. In various embodiments, the warning may provide an opportunity to replenish the account. In one embodiment, one or more features may be disabled on the user device, as discussed herein. A second period may be displayed on the UD, indicating the time remaining (i.e., second time period) until the account status escalates to a more severe level.

At block 1208 the billing server 150 determines whether the account associated with the UD is replenished during the second period. If so, (i.e., "YES", at decision block 1208), at block 1210 the billing server 150 sends a notification to the RRS 130 to indicate that the account of the UD is replenished. The process continues with block 912 of FIG. 9B, discussed previously, and therefore not repeated here for brevity.

However, upon the billing server 150 determining that the account has not been replenished during the second period, (i.e., "NO", at decision block 1208), at block 1212 the billing server 150 sends a notification to the RRS 130 to inform that the UD is now in a second state (e.g., "In Default"). For example, the user may ignore the "Payment Past Due" notification(s) and becomes behind at a second period (e.g., two months behind on payments), and the account of the user escalates to this second state (e.g., "In Default").

Consequently, the wireless telecommunication carrier of the radio access network 122 (that is under the EIP) blocks (e.g., disconnects) the UD (e.g., 102(n)) from network 122 service of the original telecommunication carrier.

At block 1214, it is determined whether the UD (e.g., 102(n)) is continued to be used with a swapped-in MVNO SIM card and/or via Wi-Fi.

If an unauthorized SIM card (e.g., on an alternate network) or Wi-Fi is not being used (i.e., "NO", at decision block 1214), at block 1216 any present warnings and/or restrictions are maintained.

However, if an unauthorized SIM card (e.g., on an alternate network) or Wi-Fi is being used (i.e., "YES", at decision block 1214), then the status of the account of the UD escalates.

At block 1218, the billing system, represented by billing server 150, updates the RRS 130 with an "In Default" status in connection with the UD. Consequently, the RRS 130 sends a notification of "In Default" status to the UDRT 240 of the UD.

As discussed previously, the UDRT 240 has a most frequently used feature module 246 that is configured to determine a predetermined number of most frequently used features that have been used on this particular UD in a predetermined time period. At block 1220, immediately, or upon the next time the UD (e.g., 102(n)) is turned ON, the UDRT 240 deactivates one or more most frequently used features of the UD.

Use Case 7

Restoring Functionality by Paying Over the Phone, in Person, or within a Browser or an Application of the Wireless Telecommunication Carrier As discussed herein, warning messages displayed on the UD, similar to those of FIGS. 3 to 6, the warning message itself may provide guidance on how to replenish the account related to the UD. For example, a user may click on an icon (e.g., "Pay"), click on a link to a customer service representative displayed on the UD, visit a local carrier store displayed on the UD, etc. Of course, the user may also replenish the account related to the UD electronically via another computing device or by interacting with a customer service representative with an alternate phone.

When payment is accepted, a record is created in the CRM server 160 and/or the billing server 150. Other databases may be notified as well, as appropriate. In various embodiments, at predetermined intervals or upon receiving the payment notification, the billing server 150 sends a notification to the RRS 130 to indicate the present account status.

In turn, the RRS 130 sends a notification to the UD to update the account status. Upon receiving the notification from the RRS 130, the UDRT 240 of the UD may restore functionality to one or more features that were previously disabled due to the trigger event. Accordingly, the UD is now allowed to use additional features of the UD and/or the services of the wireless telecommunication carrier. In one embodiment, upon receiving the communication from the RRS 130, the UDRT 240 restores all features of the UD (e.g., unlocks the UD) to a functionality before it was restricted due to a trigger event.

Use Case 8

Restoring Functionality by Un-Swapping the SIM Card

Figure 13:
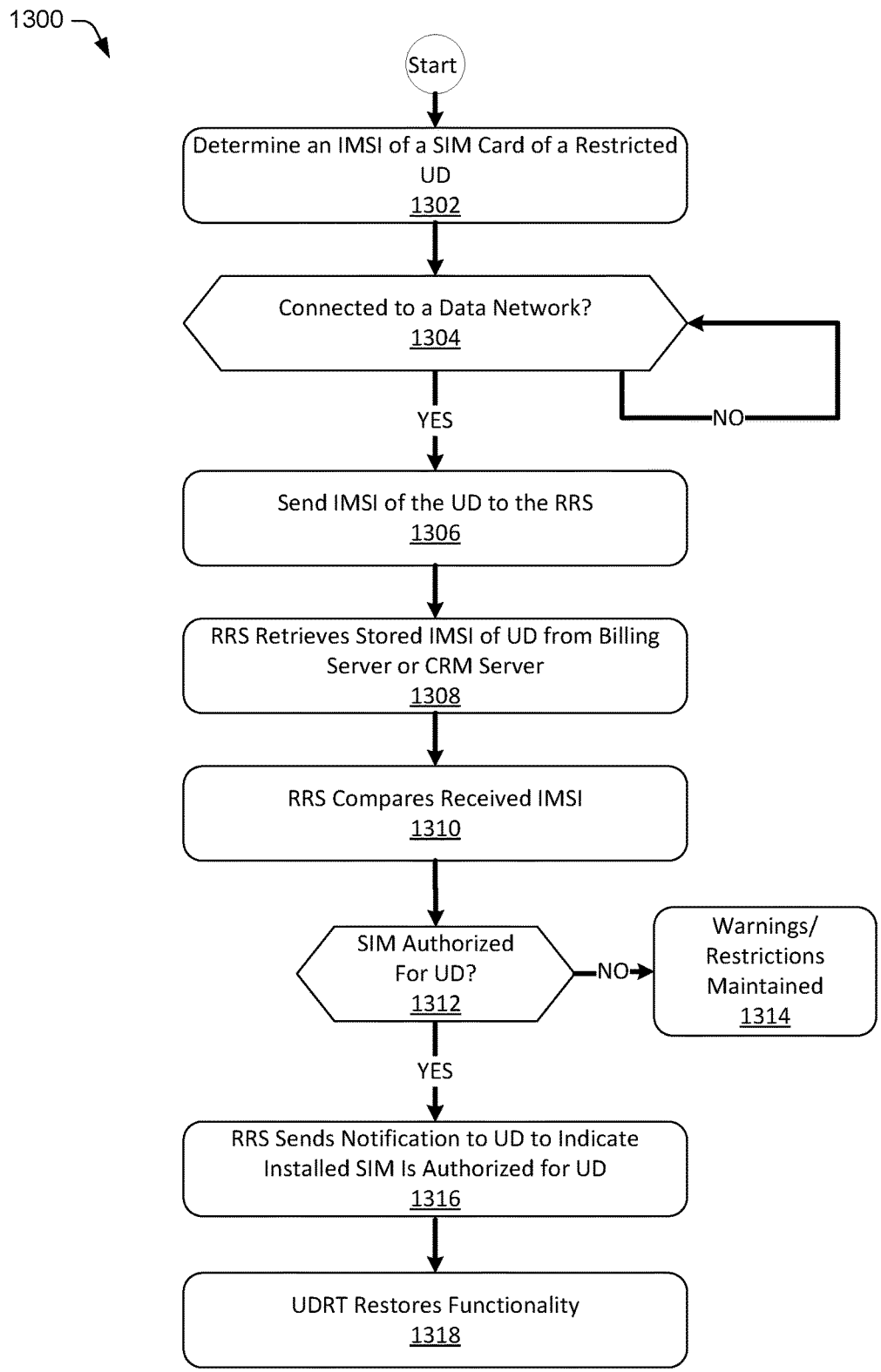
FIG. 13 illustrates a high level example process flow for restoring functionality by reinstating the original SIM card.

FIG. 13 illustrates a high level example process flow for restoring functionality by reinstating the original SIM card. For example, the user can remove the unauthorized SIM card and replace it with the original SIM card (i.e., by inserting the original SIM card to the SIM card slot), as described below.

At block 1302, the UDRT of the UD (e.g., 102(n)) determines an IMSI of the SIM card presently installed on the UD that has been previously restricted (e.g., limited in functionality). For example, such operation may be performed every time the UD is turned ON (e.g., startup).

At block 1304, the UDRT determines whether the UD is connected to a data network. The data network is not limited to the radio access network 122 of the original EIP. Rather, the data network may be any radio access network, such as the alternate radio access network 170 or Wi-Fi. Accordingly, the UDRT of the UD (e.g., 102(n)) communicates the identified SIM card's IMSI to the RRS 130 (e.g., via GCM), which may be accessed via a network that is different from the radio access network 122, such as the second radio access network 170 or via Wi-Fi.

At block 1308, in various embodiments, the RRS 130 retrieves the IMSI of the UD from the billing server 150 or the CRM server 160. In one embodiment, the RRS 130 has the IMSI of subscribing user devices stored in its memory (and therefore does not need to retrieve it from a separate server).

At block 1310, the RRS 130 compares the IMSI received from the UD and compares it with the stored IMSI. At block 1312, the RRS 130 determines whether the received IMSI is authorized for the UD (e.g., 102(n)) based on the comparison.

If the SIM card is not authorized (i.e., "NO", at decision block 1312), at block 1316, the warnings and/or restrictions are maintained for this UD (e.g., 102(n)).

If the SIM card is authorized (i.e., "YES", at decision block 1312), the RRS 130 sends a confirmation to the UDRT of the UD (e.g., 102(n)), indicating that the SIM card is authorized.

Consequently, at block 1318, in various embodiments, immediately or upon the next turning ON of the UD, the UDRT 240 of the UD (e.g., 102(n)) restores the functionality (e.g., one or more features) of the UD that were previously deactivated.

Use Case 9

Restoring Functionality by Buyer of SIM-Swapped Locked UD

Figure 14:
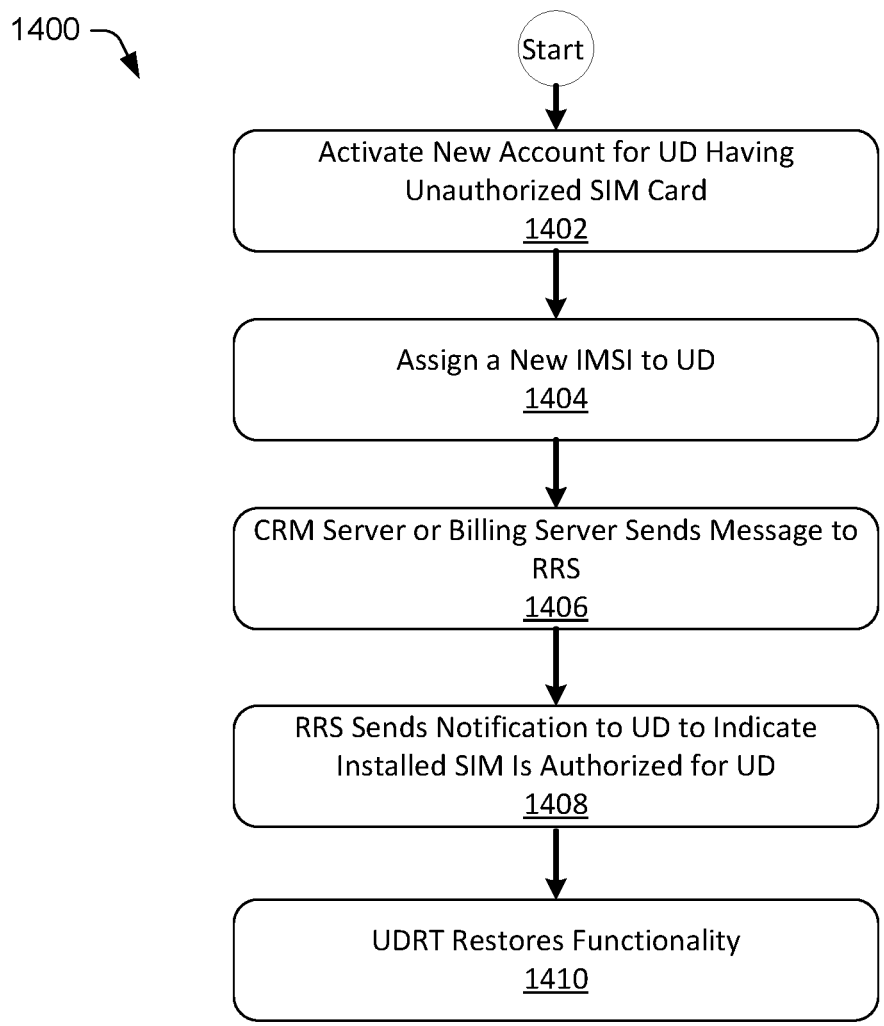
FIG. 14 illustrates a high level example process flow for restoring functionality by a user of a SIM-swapped locked user device.

FIG. 14 illustrates a high level example process flow for restoring functionality by a user (e.g., buyer) of a SIM-swapped locked UD. For example, a buyer may deliberately or inadvertently purchase a UD that has been restricted and/or blocked. To restore the functionality, the buyer provides the IMEI of the UD to a customer service representative of the wireless telecommunication carrier (that is under an EIP with the telecommunication carrier). The user may start a new service account with the wireless telecommunication carrier to overcome the present restrictions placed on the UD.

At block 1402, a new account is activated by the wireless telecommunication carrier and entered in the CRM server 160 and/or the billing server 150. At block 1404, a new IMSI is assigned to the UD by the CRM server 160.

At block 1406, a notification is sent by the CRM server 160 or the billing server 150 to the RRS 130 to notify that a new EIP is in place. More particularly, the RRS 130 is notified that the IMSI of the SIM card of the UD is now authorized.

At block 1408, the RRS 130 sends a message to the UDRT 240 of the UD to indicate that the SIM card is authorized for the UD. In particular the RRS 130 communicates with the UDRT 240 to restore one or more functions (e.g., features) that were previously limited (e.g., restricted or disabled). In one embodiment, the communication is via GCM.

Consequently, at block 1410, the UDRT 240 in the memory of the UD restores one or more functions that were previously limited.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Based upon design preferences, it is understood that the specific order or hierarchy of steps in the processes described herein may be rearranged, expanded, and some steps omitted. Some of the blocks may be performed simultaneously.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The embodiments described herein may be implemented in software that runs on one or more computing devices. The one or more computing devices may be equipped with a communication interface, a user interface, one or more processors, and memory.

The communication interface of user devices may include wireless and/or wired communication components that enable the computing devices to transmit or receive data via a network, such as the Internet. The user interface may enable a user to provide inputs and receive outputs from the computing devices.

The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

Each of the processors may be a single-core processor or a multi-core processor. Memory may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A remote recovery server of a telecommunication carrier, comprising:
   a processor;
   a network interface coupled to the processor configured to enable communications via a communication network;
   a storage device for content and programming;
   a program stored in the storage device, wherein execution of the program by the processor configures the remote recovery server to perform acts comprising:
   receiving a first account status of a user device having an equipment installment plan (EIP) with the telecommunication carrier;
   upon determining, from the received first account status, that an account of the user device has not received a payment during a first time period:
      sending a first message to the user device, which includes instructions to a program stored in a memory of the user device, the instructions of the first message causing the program to (i) present on a display of the user device a first warning regarding a remaining part of a second time period for making a payment, and (ii) limit a first functionality of the user device;
   receiving a second account status of the user device after a second time period; and
   upon determining, from the received second account status, that an account of the user device has not received a payment during the second time period:
      sending a second message to the user device, including instructions to the program stored in the memory of the user device, to present a second warning on the display of the user device.

2. The remote recovery server of claim 1, wherein the second message includes instructions to the program stored in the memory of the user device to limit a functionality of the user device to (i) an emergency call, (ii) an access to an Internet page to make an account payment for the user device, and (iii) a digital communication access to speak with a customer service representative of the telecommunication carrier.

3. The remote recovery server of claim 1, wherein execution of the program by the processor configures the remote recovery server to perform acts further comprising receiving a most frequently used feature on the user device over a predetermined time period from the user device; and wherein limiting a first functionality of the user device comprises disabling the most frequently used feature.

4. The remote recovery server of claim 1, wherein the second message includes instructions to the program stored in the memory of the user device to limit a second functionality of the user device, and wherein the act of limiting the first functionality and the second functionality of the user device is performed upon a next startup of the user device.

5. The remote recovery server of claim 1, wherein execution of the program by the processor configures the remote recovery server to perform acts further comprising upon determining that an alternate wireless service is used by the user device, sending a third message to the user device.

6. The remote recovery server of claim 5, wherein the third message includes instructions to the program stored in the memory of the user device to disconnect the user device from a radio access network of the telecommunication carrier.

7. The remote recovery server of claim 5, wherein the third message includes instructions to the program stored in the memory of the user device to redirect at least one of (i) an attempt to place a non-emergency voice call, and (ii) an attempt to access Internet on the user device, to a customer service representative or a web page of the telecommunication carrier.

8. The remote recovery server of claim 5, wherein the third message includes instructions to the program stored in the memory of the user device to (i) determine a location of the user device, and (ii) display on the display of the user device an address of a nearest store of the telecommunication carrier.

9. The remote recovery server of claim 8, wherein the third message includes instructions to the program stored in the memory of the user device to present on the display of the user device an incentive to return the user device to the telecommunication carrier.

10. The remote recovery server of claim 5, wherein an alternate wireless service comprises at least one of: (i) a communication network of an alternate telecommunication carrier, and (ii) Wi-Fi.

11. The remote recovery server of claim 10, wherein determining whether the communication network of the alternate telecommunication carrier is used comprises:
receiving an international mobile subscriber identity (IMSI) of a subscriber identity module (SIM) card presently installed on the user device from the program stored in the memory of the user device;
receiving an IMSI of a SIM card assigned by the telecommunication carrier to the user device from a second server; and
comparing the IMSI from the second server to the IMSI of the SIM card presently installed on the user device.

12. The remote recovery server of claim 11, wherein the receiving the IMSI of the SIM card presently installed on the user device from the program stored in the memory of the user device is over Google Cloud Messaging (GCM).

13. One or more non-transitory computer-readable media storing computer-executable instructions that upon execution cause one or more processors to perform acts comprising:
receiving a first account status of a user device having an equipment installment plan (EIP) with a telecommunication carrier;
upon determining, from the first received account status, that an account of the user device has not received a payment during a first time period:
sending a first message to the user device, which includes instructions to a program stored in a memory of the user device, to present a first warning on a display of the user device;
receiving a second account status of the user device after a second time period;
upon determining, from the received second account status, that an account of the user device has not received a payment during the second time period:
sending a second message to the user device, including instructions to the program stored in the memory of the user device, to present a second warning on the display of the user device; and
upon determining that an alternate wireless service is used by the user device, sending a third message to the user device that includes instructions that cause the program stored in the memory of the user device to (i) determine a location of the user device, and (ii) display on the display of the user device an address of a nearest store of the telecommunication carrier.

14. The one or more non-transitory computer-readable media of claim 13, wherein an alternate wireless service comprises at least one of: (i) a communication network of an alternate telecommunication carrier, and (ii) Wi-Fi.

15. The one or more non-transitory computer-readable media of claim 14, wherein determining whether the communication network of the alternate telecommunication carrier is used comprises:
receiving an international mobile subscriber identity (IMSI) of a subscriber identity module (SIM) card presently installed on the user device from the program stored in the memory of the user device;
receiving an IMSI of a SIM card assigned by the telecommunication carrier to the user device from a second server; and
comparing the IMSI from the second server to the IMSI of the SIM card presently installed on the user device.

16. The one or more non-transitory computer-readable media of claim 13, wherein the first message includes instructions to the program stored in the memory of the user device to (i) present on the display of the user device a remaining part of the second time period for making a payment, and (ii) limit a first functionality of the user device.

17. The one or more non-transitory computer-readable media of claim 16, wherein the second message includes instructions to the program stored in the memory of the user device to limit a functionality of the user device to (i) an emergency call, (ii) an access to an Internet page to make an account payment for the user device, and (iii) a digital communication access to speak with a customer service representative of the telecommunication carrier.

18. The one or more non-transitory computer-readable media of claim 16, wherein the acts further comprise receiving a most frequently used feature on the user device over a predetermined time period from the user device, and wherein limiting a first functionality of the user device comprises disabling the most frequently used feature.

19. The one or more non-transitory computer-readable media of claim 16, wherein the second message includes instructions to the program stored in the memory of the user device to limit a second functionality of the user device.

20. The one or more non-transitory computer-readable media of claim 19, wherein the act of limiting the first functionality and the second functionality of the user device is performed upon a next startup of the user device.

21. The one or more non-transitory computer-readable media of claim 19, wherein the third message further includes instructions to the program stored in the memory of the user device to disconnect the user device from a radio access network of the telecommunication carrier.

22. The one or more non-transitory computer-readable media of claim 19, wherein the third message further includes instructions to the program stored in the memory of the user device to redirect at least one of (i) an attempt to place a non-emergency voice call, and (ii) an attempt to access Internet on the user device, to a customer service representative or a web page of the telecommunication carrier.

23. The one or more non-transitory computer-readable media of claim 13, wherein the third message further includes instructions to the program stored in the memory of the user device to present on the display of the user device an incentive to return the user device to the telecommunication carrier.

* * * * *